United States Patent
Xiao et al.

(10) Patent No.: US 12,136,195 B2
(45) Date of Patent: Nov. 5, 2024

(54) IMAGE FUSION METHOD AND ELECTRONIC DEVICE

(71) Applicant: Honor Device Co., Ltd., Shenzhen (CN)

(72) Inventors: Bin Xiao, Shenzhen (CN); Dajun Ding, Shenzhen (CN); Yang Lu, Shenzhen (CN); Yu Wang, Shenzhen (CN); Congchao Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/915,580

(22) PCT Filed: Mar. 3, 2022

(86) PCT No.: PCT/CN2022/079139
§ 371 (c)(1),
(2) Date: Sep. 29, 2022

(87) PCT Pub. No.: WO2022/237286
PCT Pub. Date: Nov. 17, 2022

(65) Prior Publication Data
US 2024/0212100 A1    Jun. 27, 2024

(30) Foreign Application Priority Data
May 10, 2021    (CN) .......................... 202110506754.4

(51) Int. Cl.
*G06T 5/50*    (2006.01)
*H04N 23/45*   (2023.01)
(Continued)

(52) U.S. Cl.
CPC .............. *G06T 5/50* (2013.01); *H04N 23/45* (2023.01); *H04N 23/62* (2023.01);
(Continued)

(58) Field of Classification Search
CPC . G06T 5/50; G06T 2207/20221; H04N 23/45; H04N 23/62; H04N 23/632;
(Continued)

(56) References Cited

U.S. PATENT DOCUMENTS 7,469,064 B2   12/2008   Furuya et al.
9,538,152 B2   1/2017    Shabtay et al.
(Continued)

FOREIGN PATENT DOCUMENTS

CN    204392356 U    6/2015
CN    207283679 U    4/2018
(Continued)

*Primary Examiner* — Albert H Cutler
(74) *Attorney, Agent, or Firm* — Rimon PC

(57) ABSTRACT

An image fusion method and an electronic device, which relate to the field of electronic device technologies, are provided, to simplify a process of capturing a plurality of images with different features. A specific solution includes: capturing, by the electronic device, a first image, a second image, and a third image. The electronic device can process the first image to obtain a fourth image. Then, the electronic device can perform image fusion on the second image and the fourth image to obtain a fifth image. The electronic device can process the third image to obtain a sixth image. Then, the electronic device can perform image fusion on the fifth image and the sixth image to obtain a seventh image.

20 Claims, 17 Drawing Sheets

(51) Int. Cl.
  *H04N 23/62* (2023.01)
  *H04N 23/63* (2023.01)
  *H04N 23/69* (2023.01)
  *H04N 23/698* (2023.01)
  *H04N 23/951* (2023.01)

(52) U.S. Cl.
  CPC ......... *H04N 23/632* (2023.01); *H04N 23/635* (2023.01); *H04N 23/69* (2023.01); *H04N 23/698* (2023.01); *H04N 23/951* (2023.01); *G06T 2207/20221* (2013.01)

(58) Field of Classification Search
  CPC .... H04N 23/635; H04N 23/69; H04N 23/698; H04N 23/951; H04N 5/265; H04N 23/13; H04N 23/58; H04N 23/581; H04N 23/63
  See application file for complete search history.

(56) References Cited

U.S. PATENT DOCUMENTS

| | | | |
|---|---|---|---|
| 9,619,861 | B2 | 4/2017 | Na et al. |
| 11,412,132 | B2 | 8/2022 | Qin et al. |
| 11,758,265 | B2 | 9/2023 | Jiang et al. |
| 2006/0238617 | A1 | 10/2006 | Tamir |
| 2007/0076099 | A1* | 4/2007 | Eshed .................. H04N 23/951 |
| | | | 348/E5.051 |
| 2020/0336674 | A1 | 10/2020 | Bernstein et al. |
| 2021/0075975 | A1* | 3/2021 | Du ...................... H04N 23/698 |
| 2022/0279124 | A1 | 9/2022 | Huang |
| 2023/0094025 | A1* | 3/2023 | Jiang ..................... H04N 23/69 |
| | | | 348/333.11 |

FOREIGN PATENT DOCUMENTS

| | | | |
|---|---|---|---|
| CN | 108712608 | A | 10/2018 |
| CN | 110248081 | A | 9/2019 |
| CN | 110506416 | A | 11/2019 |
| CN | 111062881 | A | 4/2020 |
| CN | 111183632 | A | 5/2020 |
| CN | 111294517 | A | 6/2020 |
| CN | 113364975 | A | 9/2021 |
| EP | 1496471 | A1 | 1/2005 |
| JP | 2018113683 | A | 7/2018 |
| RU | 2452033 | C2 | 5/2012 |

* cited by examiner (a)

(b)

(c)

(a)

(b)

(a)

(b)

(a)

(b)

IMAGE FUSION METHOD AND ELECTRONIC DEVICE

CROSS-REFERENCE TO RELATED APPLICATIONS

This application is a National Stage of International Application No. PCT/CN2022/079139, filed on Mar. 3, 2022, which claims priority to Chinese Patent Application Ser. No. 20/2110506754.4, filed on May 10, 2021. The disclosures of both the aforementioned applications are incorporated herein by reference in their entireties.

TECHNICAL FIELD

Embodiments of this application relate to the field of electronic device technologies, and in particular, to an image fusion method and an electronic device.

BACKGROUND

With the development of electronic technologies, an electronic device (such as a mobile phone, a tablet computer, or a smart watch) has an increasing quantity of functions. For example, most electronic device can be equipped with a camera, so that the electronic devices have an image capturing function.

Using a mobile phone as an example, the mobile phone may be equipped with a plurality of cameras such as a main camera, a telephoto camera, and a wide-angle camera. Based on the features of the foregoing cameras, the mobile phone can use different cameras to capture images in a same shooting scenario, so as to obtain images with different features. For example, based on the feature that the telephoto camera has a long focal length, the mobile phone can use the telephoto camera to capture locally clear telephoto images. In another example, based on the feature that the main camera has a large amount of admitted light and a high resolution, the mobile phone can use the main camera to capture entirely relatively clear images. In another example, based on the feature that the wide-angle camera has a short focal length and a large viewing angle, the mobile phone can use the wide-angle camera to capture images with larger viewing angles.

However, in the conventional technology, the electronic device needs to respond to a plurality of operations performed by the user before capturing a plurality of images with different features. The shooting process of the electronic device is relatively cumbersome, which affects the shooting experience of the user.

SUMMARY

This application provides an image fusion method and an electronic device, to simplify a process of capturing a plurality of images with different features and improve the shooting experience of a user.

According to a first aspect, this application provides an image fusion method. The method can be applied to an electronic device, where the electronic device includes a first camera, a second camera, and a third camera, a field of view of the first camera is greater than a field of view of the second camera, and a field of view of the third camera is greater than the field of view of the first camera.

In the method, the electronic device detects a first operation. The electronic device can capture a first image through the first camera, a second image through the second camera, and a third image through the third camera in response to the first operation. A viewfinder coverage in which the first camera captures the first image is a first viewfinder coverage, a viewfinder coverage in which the second camera captures the second image is a second viewfinder coverage, a viewfinder coverage in which the third camera captures the third image is a third viewfinder coverage, the third viewfinder coverage is greater than the first viewfinder coverage, and the first viewfinder coverage is greater than the second viewfinder coverage. The electronic device can process the first image to obtain a fourth image. The fourth image includes a first region image, a resolution of the first region image in the fourth image is the same as a resolution of the second image, a viewfinder coverage of the first region image relative to the first camera is a fourth viewfinder coverage, the first viewfinder coverage includes the fourth viewfinder coverage, and the fourth viewfinder coverage coincides with the second viewfinder coverage. Then, the electronic device can perform image fusion on the second image and the fourth image to obtain a fifth image.

It may be understood that because the resolution of the first region image in the fourth image is the same as the resolution of the second image, and the viewfinder coverage of the first region image is the same as the second viewfinder coverage, the electronic device can perform image fusion on the second image and the fourth image. In addition, the second image has the feature that a local image (that is, an image of a distant object) is clear, and the fourth image has the feature that the overall image is relatively clear. The electronic device performs image fusion on the second image and the fourth image, and can combine the features of the second image and the fourth image to obtain a fifth image of which the overall image has a relatively high definition of an and a local image has a relatively high definition. That is, the fifth image combines the features of the second image and the first image. In this way, the quality of images captured by the electronic device can be improved.

The electronic device can process the third image to obtain a sixth image. The sixth image includes a second region image, a resolution of the second region image in the sixth image is the same as a resolution of the first image, a viewfinder coverage of the second region image relative to the third camera is a fifth viewfinder coverage, the third viewfinder coverage includes the fifth viewfinder coverage, and the fifth viewfinder coverage coincides with the first viewfinder coverage. Then, the electronic device can perform image fusion on the fifth image and the sixth image to obtain a seventh image.

It may be understood that because the resolution of the second region image in the sixth image is the same as the resolution of the fifth image, and the viewfinder coverage of the second region image is the same as the viewfinder coverage of the fifth image, the electronic device can perform image fusion on the fifth image and the sixth image. In addition, the fifth image has the feature that the overall image is relatively clear and a local image (that is, an image of a distant object) is clear, and the sixth image has a relatively large viewfinder coverage. The electronic device performs image fusion on the fifth image and the sixth image, and can combines the features of the fifth image and the sixth image to obtain a seventh image of which a viewfinder coverage is relatively large, the overall image has a relatively high definition, and a local image has a relatively high definition. That is, the seventh image combines the features of the first image, the second image, and the third image. In this way, the quality of images captured by the electronic device can be improved.

In addition, it can be learned from the above that by performing only one operation, the user can obtain an image with features of a plurality of images through an electronic device, so that the shooting process is simplified, and the user experience is improved.

With reference to the first aspect, in a possible design manner, the processing, by the electronic device, the first image to obtain a fourth image includes: performing, by the electronic device, super-resolution reconstruction on the first image to obtain the fourth image.

It may be understood that the electronic device performs super-resolution reconstruction on the first image, which can increase a resolution of the first image, that is, a resolution of the fourth image is greater than the resolution of the first image. In this way, it can be ensured that the resolution of the first region image in the obtained fourth image is the same as the resolution of the second image. Further, it can be ensured that the electronic device performs fusion on the fourth image and the second image to obtain an image with different image features.

With reference to the first aspect, in another possible design manner, the processing, by the electronic device, the third image to obtain a sixth image includes: performing, by the electronic device, super-resolution reconstruction on the third image to obtain the sixth image.

It may be understood that the electronic device performs super-resolution reconstruction on the third image, which can increase a resolution of the third image, that is, a resolution of the sixth image is greater than the resolution of the third image. In this way, it can be ensured that the resolution of the second region image in the obtained sixth image is the same as the resolution of the first image. Further, it can be ensured that the electronic device performs fusion on the sixth image and the fifth image to obtain an image with different image features.

With reference to the first aspect, in another possible design manner, after the performing, by the electronic device, image fusion on the fifth image and the sixth image to obtain a seventh image, the method further includes: receiving, by the electronic device, a second operation, where the second operation is used for triggering the electronic device to display the seventh image. The electronic device can display a first interface in response to the second operation, where the first interface is configured to play a dynamic screen in which the seventh image is centered on a third region image and is automatically zoomed. The seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage.

For example, the seventh image can be centered on the third region image, and the seventh image can be automatically zoomed according to zoom ratios in descending order. A maximum zoom ratio of the seventh image is a zoom ratio of the second image, and a minimum zoom ratio of the seventh image is a zoom ratio of the third image.

It may be understood that the electronic device displays the seventh image in a dynamic mode, so that the user can view a dynamic image, which increases interest of viewing the image.

With reference to the first aspect, in another possible design manner, the first playback interface further includes a first speed option and a first ratio option, where the first speed option is configured to adjust a playback speed of the dynamic screen, and the first ratio option is configured to adjust a maximum zoom ratio of the seventh image in the first interface. The method further includes: adjusting, by the electronic device, the playback speed of the dynamic screen in response to an adjustment operation performed by a user on the first speed option; and adjusting, by the electronic device, the maximum zoom ratio of the seventh image in response to an adjustment operation performed by the user on the first ratio option.

For example, the first speed option can instruct the electronic device to automatically zoom the seventh image at 100 pixel/s or 20% FOV/s. When the zoom ratio of the second image is 4×, a maximum magnification ratio of the seventh image can be 4×.

It may be understood that the first speed option and the first ratio option can enable the user to adjust a zoom speed and a maximum magnification ratio of the image, so that the user experience is improved.

With reference to the first aspect, in another possible design manner, the first interface further includes a manual playback button, where the manual playback button is configured to trigger the electronic device to display a second interface. The second interface includes the seventh image and a preset ratio option, and the preset ratio option is configured to set a zoom ratio of the seventh image.

That is, the electronic device can be switched from a mode of dynamically playing the seventh image to a mode of manually playing the seventh image. In this way, the user can flexibly select a mode for displaying the seventh image, so that the user experience is improved.

With reference to the first aspect, in another possible design manner, after the performing, by the electronic device, image fusion on the fifth image and the sixth image to obtain a seventh image, the method further includes: receiving, by the electronic device, a second operation, where the second operation is used for triggering the electronic device to display the seventh image. The electronic device can display the second interface in response to the second operation, where the second interface includes the seventh image and a preset ratio option, and the preset ratio option is configured to set a zoom ratio of the seventh image. The method further includes: receiving, by the electronic device, a zoom ratio set by a user in the preset ratio option, and displaying the seventh image according to the zoom ratio set by the user.

It may be understood that after the electronic device receives an operation performed on a preset ratio option, the electronic device can display an image zoomed at a preset ratio. That is, the seventh image can display a region with features of different images (such as the first image, the second image, or the third image). In this way, the user can view the features of different images in one image, so that the user experience is improved.

With reference to the first aspect, in another possible design manner, the second interface further includes an automatic playback button, and the automatic playback button is configured to trigger the electronic device to display a first interface. The first interface is configured to play a dynamic screen in which the seventh image is centered on a third region image and is automatically zoomed, where the seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage.

That is, the electronic device can be switched from a mode of manually playing the seventh image to a mode of dynamically playing the seventh image. In this way, the user can flexibly select a mode for displaying the seventh image, so that the user experience is improved.

With reference to the first aspect, in another possible design manner, the first interface includes a format conversion button, where the format conversion button is configured to trigger the electronic device to convert a file format of the seventh image. The method further includes: receiving, by the electronic device, a third operation performed on the format conversion button to generate a first file, where the first file is a video file in which the seventh image is centered on the third region image and is automatically zoomed; or the first file is a graphic interchange format GIF image in which the seventh image is centered on the third region image and is automatically zoomed.

It may be understood that the first file can automatically zoom the seventh image in any electronic device. In this way, after receiving the first file, other electronic devices can display the automatically zoomed seventh image, so that the user experience is improved.

With reference to the first aspect, in another possible design manner, the first camera is a main camera, the second camera is a telephoto camera, and the third camera is a wide-angle camera.

When the first camera is the main camera, the first image is a main image. When the second camera is the telephoto camera, the second image is a telephoto image. When the third camera is the wide-angle camera, the third image is a wide-angle image. That is, the seventh image obtained by the electronic device has a plurality of features such as a relatively large viewfinder coverage, a relatively high definition of an overall image, and a relatively high definition of a local image. That is, the seventh image combines features of the main image, the telephoto image, and the wide-angle image. In this way, the quality of images captured by the electronic device can be improved. In addition, by performing only one operation, the user can obtain an image with features of a plurality of images through an electronic device, so that the shooting process is simplified, and the user experience is improved.

According to a second aspect, this application provides an image fusion method. The method can be applied to an electronic device. The electronic device includes a first camera, a second camera, a third camera, and a fourth camera, a field of view of the first camera is greater than a field of view of the second camera, a field of view of the third camera is greater than the field of view of the first camera, and a field of view of the fourth camera is the same as the field of view of the first camera.

In the method, the electronic device detects a first operation. The electronic device can capture a first image through the first camera, a second image through the second camera, a third image through the third camera, and an eighth image through the fourth camera in response to the first operation. A viewfinder coverage in which the first camera captures the first image is a first viewfinder coverage, a viewfinder coverage in which the second camera captures the second image is a second viewfinder coverage, a viewfinder coverage in which the third camera captures the third image is a third viewfinder coverage, the third viewfinder coverage is greater than the first viewfinder coverage, the first viewfinder coverage is greater than the second viewfinder coverage, and a viewfinder coverage in which the fourth camera captures the eighth image is the same as the first viewfinder coverage. The electronic device can perform image fusion on the first image and the eighth image to obtain a ninth image.

It may be understood that image fusion can improve the image quality. The electronic device performs image fusion on the first image and the eighth image, and image quality of the obtained ninth image is higher than image quality of the first image (or the eighth image). In this way, the quality of images captured by the electronic device can be improved.

The electronic device can process the ninth image to obtain a fourth image. The fourth image includes a first region image, a resolution of the first region image in the fourth image is the same as a resolution of the second image, a viewfinder coverage of the first region image relative to the first camera is a fourth viewfinder coverage, the first viewfinder coverage includes the fourth viewfinder coverage, and the fourth viewfinder coverage coincides with the second viewfinder coverage. Then, the electronic device can perform image fusion on the second image and the fourth image to obtain a fifth image.

It may be understood that because the ninth image is an image obtained through image fusion, the image quality is relatively high. Therefore, the image quality of the fourth image is relatively high. In addition, because the resolution of the first region image in the fourth image is the same as the resolution of the second image, and the viewfinder coverage of the first region image is the same as the second viewfinder coverage, the electronic device can perform image fusion on the second image and the fourth image. In addition, the second image has the feature that a local image (that is, an image of a distant object) is clear, and the fourth image has the feature that the overall image is relatively clear. The electronic device performs image fusion on the second image and the fourth image, and can combine the features of the second image and the fourth image to obtain a fifth image of which the overall image has a relatively high definition of an and a local image has a relatively high definition. That is, the fifth image combines the features of the second image and the first image. In this way, the quality of images captured by the electronic device can be improved.

The electronic device can process the third image to obtain a sixth image. The sixth image includes a second region image, a resolution of the second region image in the sixth image is the same as a resolution of the first image, a viewfinder coverage of the second region image relative to the third camera is a fifth viewfinder coverage, the third viewfinder coverage includes the fifth viewfinder coverage, and the fifth viewfinder coverage coincides with the first viewfinder coverage. The electronic device can perform image fusion on the fifth image and the sixth image to obtain a seventh image.

It may be understood that because the resolution of the second region image in the sixth image is the same as the resolution of the fifth image, and the viewfinder coverage of the second region image is the same as the viewfinder coverage of the fifth image, the electronic device can perform image fusion on the fifth image and the sixth image. In addition, the fifth image has the feature that the overall image is relatively clear and a local image (that is, an image of a distant object) is clear, and the sixth image has a relatively large viewfinder coverage. The electronic device performs image fusion on the fifth image and the sixth image, and can combines the features of the fifth image and the sixth image to obtain a seventh image of which a viewfinder coverage is relatively large, the overall image has a relatively high definition, and a local image has a relatively high definition. That is, the seventh image combines the features of the first image, the second image, and the third image. In this way, the quality of images captured by the electronic device can be improved.

In addition, it can be learned from the above that by performing only one operation, the user can obtain an image with features of a plurality of images through an electronic device, so that the shooting process is simplified, and the user experience is improved.

With reference to the second aspect, in a possible design manner, the processing, by the electronic device, the ninth image to obtain a fourth image includes: performing, by the electronic device, super-resolution reconstruction on the ninth image to obtain the fourth image.

It may be understood that the electronic device performs super-resolution reconstruction on the ninth image, which can increase a resolution of the ninth image, that is, a resolution of the fourth image is greater than the resolution of the ninth image. In this way, it can be ensured that the resolution of the first region image in the obtained fourth image is the same as the resolution of the second image. Further, it can be ensured that the electronic device performs fusion on the fourth image and the second image to obtain an image with different image features.

With reference to the second aspect, in another possible design manner, the processing, by the electronic device, the third image to obtain a sixth image includes: performing, by the electronic device, super-resolution reconstruction on the third image to obtain the sixth image.

It may be understood that the electronic device performs super-resolution reconstruction on the third image, which can increase a resolution of the third image, that is, a resolution of the sixth image is greater than the resolution of the third image. In this way, it can be ensured that the resolution of the second region image in the obtained sixth image is the same as the resolution of the first image. Further, it can be ensured that the electronic device performs fusion on the sixth image and the fifth image to obtain an image with different image features.

With reference to the second aspect, in another possible design manner, after the performing, by the electronic device, image fusion on the fifth image and the sixth image to obtain a seventh image, the method further includes: receiving, by the electronic device, a second operation, where the second operation is used for triggering the electronic device to display the seventh image. The electronic device can display a first interface in response to the second operation, where the first interface is configured to play a dynamic screen in which the seventh image is centered on a third region image and is automatically zoomed. The seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage.

For example, the seventh image can be centered on the third region image, and the seventh image can be automatically zoomed according to zoom ratios in descending order. A maximum zoom ratio of the seventh image is a zoom ratio of the second image, and a minimum zoom ratio of the seventh image is a zoom ratio of the third image.

It may be understood that the electronic device displays the seventh image in a dynamic mode, so that the user can view a dynamic image, which increases interest of viewing the image.

With reference to the second aspect, in another possible design manner, the first playback interface further includes a first speed option and a first ratio option, where the first speed option is configured to adjust a playback speed of the dynamic screen, and the first ratio option is configured to adjust a maximum zoom ratio of the seventh image in the first interface. The method further includes: adjusting, by the electronic device, the playback speed of the dynamic screen in response to an adjustment operation performed by a user on the first speed option; and adjusting, by the electronic device, the maximum zoom ratio of the seventh image in response to an adjustment operation performed by the user on the first ratio option.

For example, the first speed option can instruct the electronic device to automatically zoom the seventh image at 100 pixel/s or 20% FOV/s. When the zoom ratio of the second image is 4×, a maximum magnification ratio of the seventh image can be 4×.

It may be understood that the first speed option and the first ratio option can enable the user to adjust a zoom speed and a maximum magnification ratio of the image, so that the user experience is improved.

With reference to the second aspect, in another possible design manner, the first interface further includes a manual playback button, where the manual playback button is configured to trigger the electronic device to display a second interface. The second interface includes the seventh image and a preset ratio option, and the preset ratio option is configured to set a zoom ratio of the seventh image.

That is, the electronic device can be switched from a mode of dynamically playing the seventh image to a mode of manually playing the seventh image. In this way, the user can flexibly select a mode for displaying the seventh image, so that the user experience is improved.

With reference to the second aspect, in another possible design manner, after the performing, by the electronic device, image fusion on the fifth image and the sixth image to obtain a seventh image, the method further includes: receiving, by the electronic device, a second operation, where the second operation is used for triggering the electronic device to display the seventh image. The electronic device can display the second interface in response to the second operation, where the second interface includes the seventh image and a preset ratio option, and the preset ratio option is configured to set a zoom ratio of the seventh image. The method further includes: receiving, by the electronic device, a zoom ratio set by a user in the preset ratio option, and displaying the seventh image according to the zoom ratio set by the user.

It may be understood that after the electronic device receives an operation performed on a preset ratio option, the electronic device can display an image zoomed at a preset ratio. That is, the seventh image can display a region with features of different images (such as the first image, the second image, or the third image). In this way, the user can view the features of different images in one image, so that the user experience is improved.

With reference to the second aspect, in another possible design manner, the second interface further includes an automatic playback button, and the automatic playback button is configured to trigger the electronic device to display a first interface. The first interface is configured to play a dynamic screen in which the seventh image is centered on a third region image and is automatically zoomed, where the seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage.

That is, the electronic device can be switched from a mode of manually playing the seventh image to a mode of dynamically playing the seventh image. In this way, the user can flexibly select a mode for displaying the seventh image, so that the user experience is improved.

With reference to the second aspect, in another possible design manner, the first interface includes a format conversion button, where the format conversion button is configured to trigger the electronic device to convert a file format of the seventh image. The method further includes: receiving, by the electronic device, a third operation performed on the format conversion button to generate a first file, where the first file is a video file in which the seventh image is centered on the third region image and is automatically zoomed; or the first file is a graphic interchange format GIF image in which the seventh image is centered on the third region image and is automatically zoomed.

It may be understood that the first file can automatically zoom the seventh image in any electronic device. In this way, after receiving the first file, other electronic devices can display the automatically zoomed seventh image, so that the user experience is improved.

With reference to the second aspect, in another possible design manner, the first camera is a main camera, the second camera is a telephoto camera, and the third camera is a wide-angle camera.

When the first camera is the main camera, the first image is a main image. When the second camera is the telephoto camera, the second image is a telephoto image. When the third camera is the wide-angle camera, the third image is a wide-angle image. That is, the seventh image obtained by the electronic device has a plurality of features such as a relatively large viewfinder coverage, a relatively high definition of an overall image, and a relatively high definition of a local image. That is, the seventh image combines features of the main image, the telephoto image, and the wide-angle image. In this way, the quality of images captured by the electronic device can be improved. In addition, by performing only one operation, the user can obtain an image with features of a plurality of images through an electronic device, so that the shooting process is simplified, and the user experience is improved.

According to a third aspect, this application provides an electronic device. The electronic device includes: a memory, a display screen, and a processor. The memory and the display screen are coupled to the processor; the memory is configured to store computer program code, and the computer program code includes computer instructions; and the processor is configured to detect the first operation when the computer instructions is executed by the processor. The processor is further configured to capture a first image through the first camera, a second image through the second camera, and a third image through the third camera in response to the first operation, where A viewfinder coverage in which the first camera captures the first image is a first viewfinder coverage, a viewfinder coverage in which the second camera captures the second image is a second viewfinder coverage, a viewfinder coverage in which the third camera captures the third image is a third viewfinder coverage, the third viewfinder coverage is greater than the first viewfinder coverage, and the first viewfinder coverage is greater than the second viewfinder coverage. The processor is further configured to process the first image to obtain a fourth image. The fourth image includes a first region image, a resolution of the first region image in the fourth image is the same as a resolution of the second image, a viewfinder coverage of the first region image relative to the first camera is a fourth viewfinder coverage, the first viewfinder coverage includes the fourth viewfinder coverage, and the fourth viewfinder coverage coincides with the second viewfinder coverage. The processor is further configured to perform image fusion on the second image and the fourth image to obtain a fifth image. The processor is further configured to process the third image to obtain a sixth image. The sixth image includes a second region image, a resolution of the second region image in the sixth image is the same as a resolution of the first image, a viewfinder coverage of the second region image relative to the third camera is a fifth viewfinder coverage, the third viewfinder coverage includes the fifth viewfinder coverage, and the fifth viewfinder coverage coincides with the first viewfinder coverage. The processor is further configured to perform image fusion on the fifth image and the sixth image to obtain a seventh image.

With reference to the third aspect, in a possible design manner, when the computer instructions are executed by the processor, the processor is further configured to perform super-resolution reconstruction on the first image to obtain a fourth image.

With reference to the third aspect, in another possible design manner, when the computer instructions are executed by the processor, the processor is further configured to perform super-resolution reconstruction on the third image to obtain a sixth image.

With reference to the third aspect, in another possible design manner, when the computer instructions are executed by the processor, the processor is further configured to receive a second operation, where the second operation is used for triggering a display screen to display a seventh image. The display screen displays a first interface in response to the second operation, where the first interface is configured to play a dynamic screen in which the seventh image is centered on a third region image and is automatically zoomed. The seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage.

With reference to the third aspect, in another possible design manner, the first playback interface further includes a first speed option and a first ratio option, where the first speed option is configured to adjust a playback speed of the dynamic screen, and the first ratio option is configured to adjust a maximum zoom ratio of the seventh image in the first interface. When the computer instructions are executed by the processor, the processor is further configured to adjust the playback speed of the dynamic screen in response to an adjustment operation performed by a user on the first speed option. The processor is further configured to adjust the maximum zoom ratio of the seventh image in response to an adjustment operation performed by the user on the first ratio option.

With reference to the third aspect, in another possible design manner, the first interface further includes a manual playback button, where the manual playback button is configured to trigger the display screen to display a second interface. The second interface includes the seventh image and a preset ratio option, and the preset ratio option is configured to set a zoom ratio of the seventh image.

With reference to the third aspect, in another possible design manner, when the computer instructions are executed by the processor, the processor is further configured to receive a second operation, where the second operation is used for triggering a display screen to display a seventh image. The display screen is further configured to display a second interface in response to the second operation, where the second interface includes the seventh image and a preset ratio option, and the preset ratio option is configured to set a zoom ratio of the seventh image. The display screen is further configured to receive a zoom ratio set by a user in the preset ratio option, and display the seventh image according to the zoom ratio set by the user.

With reference to the third aspect, in another possible design manner, the second interface further includes an automatic playback button, and the automatic playback button is configured to trigger the display screen to display a first interface. The first interface is configured to play a dynamic screen in which the seventh image is centered on a third region image and is automatically zoomed, where the seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage.

With reference to the third aspect, in another possible design manner, the first interface includes a format conversion button, where the format conversion button is configured to trigger the processor to convert a file format of the seventh image. When the computer instructions are executed by the processor, the processor is further configured to receive a third operation performed on the format conversion button to generate a first file, where the first file is a video file in which the seventh image is centered on the third region image and is automatically zoomed; or the first file is a graphic interchange format GIF image in which the seventh image is centered on the third region image and is automatically zoomed.

With reference to the third aspect, in another possible design manner, the first camera is a main camera, the second camera is a telephoto camera, and the third camera is a wide-angle camera.

According to a fourth aspect, this application provides an electronic device. The electronic device includes: a memory, a display screen, and a processor. The memory and the display screen are coupled to the processor; the memory is configured to store computer program code, and the computer program code includes computer instructions; and the processor is configured to detect the first operation when the computer instructions is executed by the processor. The processor is further configured to capture a first image through the first camera, a second image through the second camera, a third image through the third camera, and an eighth image through the fourth camera in response to the first operation, where A viewfinder coverage in which the first camera captures the first image is a first viewfinder coverage, a viewfinder coverage in which the second camera captures the second image is a second viewfinder coverage, a viewfinder coverage in which the third camera captures the third image is a third viewfinder coverage, the third viewfinder coverage is greater than the first viewfinder coverage, the first viewfinder coverage is greater than the second viewfinder coverage, and a viewfinder coverage in which the fourth camera captures the eighth image is the same as the first viewfinder coverage. The processor is further configured to perform image fusion on the first image and the eighth image to obtain a ninth image. The processor is further configured to process the ninth image to obtain a fourth image. The fourth image includes a first region image, a resolution of the first region image in the fourth image is the same as a resolution of the second image, a viewfinder coverage of the first region image relative to the first camera is a fourth viewfinder coverage, the first viewfinder coverage includes the fourth viewfinder coverage, and the fourth viewfinder coverage coincides with the second viewfinder coverage. The processor is further configured to perform image fusion on the second image and the fourth image to obtain a fifth image. The processor is further configured to process the third image to obtain a sixth image. The sixth image includes a second region image, a resolution of the second region image in the sixth image is the same as a resolution of the first image, a viewfinder coverage of the second region image relative to the third camera is a fifth viewfinder coverage, the third viewfinder coverage includes the fifth viewfinder coverage, and the fifth viewfinder coverage coincides with the first viewfinder coverage. The processor is further configured to perform image fusion on the fifth image and the sixth image to obtain a seventh image.

With reference to the fourth aspect, in a possible design manner, when the computer instructions are executed by the processor, the processor is further configured to perform super-resolution reconstruction on the ninth image to obtain a fourth image.

With reference to the fourth aspect, in another possible design manner, when the computer instructions are executed by the processor, the processor is further configured to perform super-resolution reconstruction on the third image to obtain a sixth image.

With reference to the fourth aspect, in another possible design manner, when the computer instructions are executed by the processor, the processor is further configured to receive a second operation, where the second operation is used for triggering a display screen to display a seventh image. The display screen displays a first interface in response to the second operation, where the first interface is configured to play a dynamic screen in which the seventh image is centered on a third region image and is automatically zoomed. The seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage.

With reference to the fourth aspect, in another possible design manner, the first playback interface further includes a first speed option and a first ratio option, where the first speed option is configured to adjust a playback speed of the dynamic screen, and the first ratio option is configured to adjust a maximum zoom ratio of the seventh image in the first interface. When the computer instructions are executed by the processor, the processor is further configured to adjust the playback speed of the dynamic screen in response to an adjustment operation performed by a user on the first speed option. The processor is further configured to adjust the maximum zoom ratio of the seventh image in response to an adjustment operation performed by the user on the first ratio option.

With reference to the fourth aspect, in another possible design manner, the first interface further includes a manual playback button, where the manual playback button is configured to trigger the display screen to display a second interface. The second interface includes the seventh image and a preset ratio option, and the preset ratio option is configured to set a zoom ratio of the seventh image.

With reference to the fourth aspect, in another possible design manner, when the computer instructions are executed by the processor, the processor is further configured to receive a second operation, where the second operation is used for triggering a display screen to display a seventh image. The display screen is further configured to display a second interface in response to the second operation, where the second interface includes the seventh image and a preset ratio option, and the preset ratio option is configured to set a zoom ratio of the seventh image. The display screen is further configured to receive a zoom ratio set by a user in the preset ratio option, and display the seventh image according to the zoom ratio set by the user.

With reference to the fourth aspect, in another possible design manner, the second interface further includes an automatic playback button, and the automatic playback button is configured to trigger the display screen to display a first interface. The first interface is configured to play a dynamic screen in which the seventh image is centered on a third region image and is automatically zoomed, where the seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage.

With reference to the fourth aspect, in another possible design manner, the first interface includes a format conversion button, where the format conversion button is configured to trigger the processor to convert a file format of the seventh image. When the computer instructions are executed by the processor, the processor is further configured to receive a third operation performed on the format conversion button to generate a first file, where the first file is a video file in which the seventh image is centered on the third region image and is automatically zoomed; or the first file is a graphic interchange format GIF image in which the seventh image is centered on the third region image and is automatically zoomed.

With reference to the fourth aspect, in another possible design manner, the first camera is a main camera, the second camera is a telephoto camera, and the third camera is a wide-angle camera.

According to a fifth aspect, this application provides an electronic device. The electronic device includes: a memory and a processor. The memory is coupled to the processor; the memory is configured to store computer program code, and the computer program code includes computer instructions; and when executed by the processor, the computer instructions cause the electronic device to perform the method described in the first aspect and any possible design manner thereof.

According to a sixth aspect, this application provides an electronic device. The electronic device includes: a memory and a processor. The memory is coupled to the processor; the memory is configured to store computer program code, and the computer program code includes computer instructions; and when executed by the processor, the computer instructions cause the electronic device to perform the method described in the second aspect and any possible design manner thereof.

According to a seventh aspect, this application provides a chip system. The chip system is applied to an electronic device. The chip system includes one or more interface circuits and one or more processors. The interface circuit and the processor are connected to each other by a line. The interface circuit is configured to receive signals from the memory of the electronic device and send the signals to the processor. The signals include computer instructions stored in the memory. When the processor executes the computer instructions, the electronic device performs the method described in the first aspect or the second aspect and any possible design manner thereof.

According to an eighth aspect, this application provides a computer-readable storage medium, including computer instructions, where the computer instructions, when run on an electronic device, cause the electronic device to perform the method described in the first aspect or the second aspect and any possible design manner thereof.

According to a ninth aspect, this application provides a computer program product, where the computer program product, when run on a computer, cause the computer to perform the method described in the first aspect or the second aspect and any possible design manner thereof.

It may be understood that for the beneficial effects that may be achieved by the electronic device described in the third aspect and any possible design manner thereof, the electronic device described in the fourth aspect and any possible design manner thereof, the electronic device described in the fifth aspect, the electronic device described in the sixth aspect, the chip system described in the seventh aspect, the computer-readable storage medium described in the eighth aspect, and the computer program product described in the ninth aspect provided above, reference may be made to the beneficial effects in the first aspect or the second aspect and any possible design manner thereof, and details are not described herein again.

DESCRIPTION OF EMBODIMENTS

Figure 1:
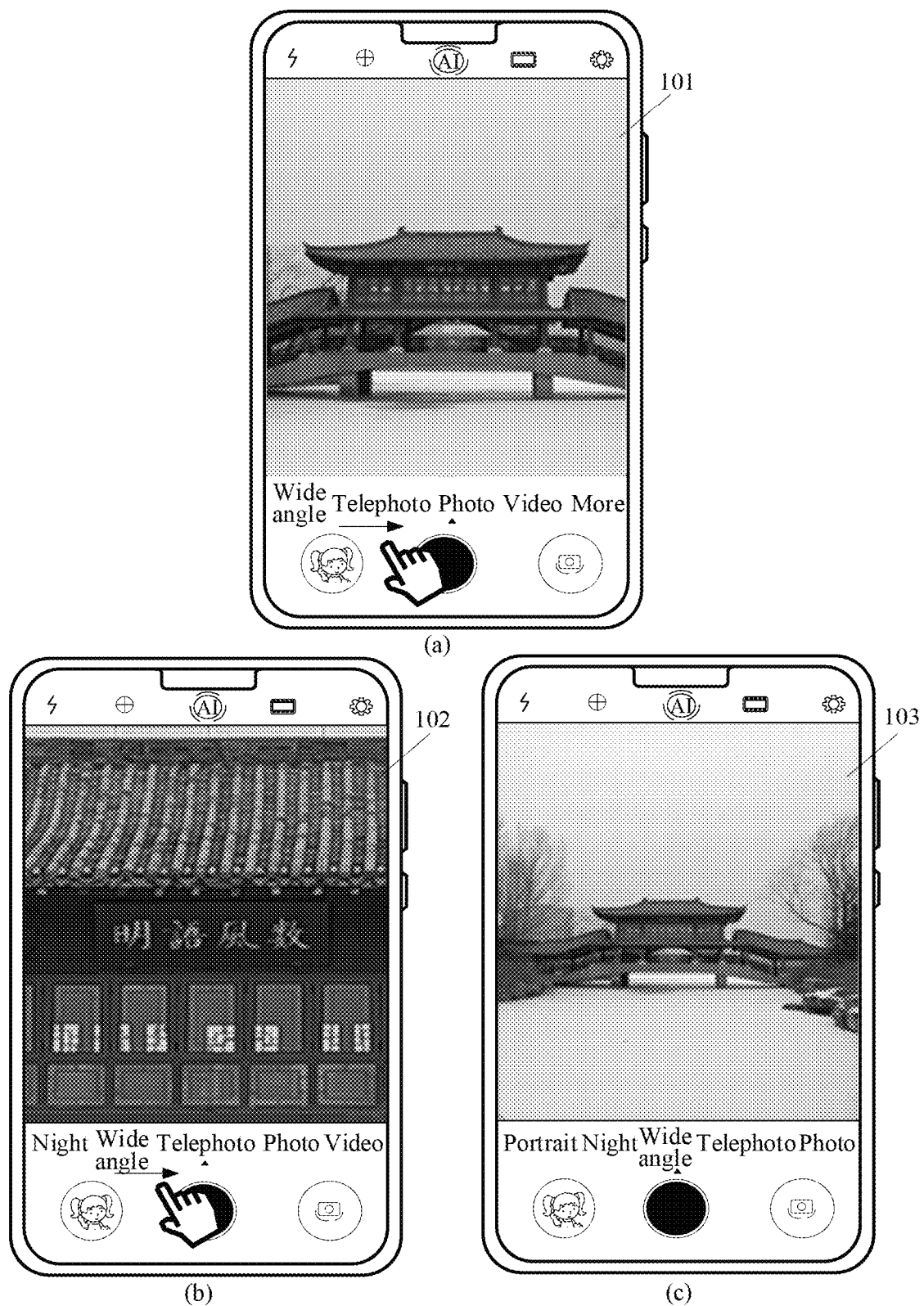
FIG. 1 is a schematic diagram of an example image preview interface.

The technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The character "/" in this application generally indicates an "or" relationship between the associated objects. For example, A/B can be understood as A or B.

the terms "first" and "second" are used merely for the purpose of description, and shall not be construed as indicating or implying relative importance or implying a quantity of indicated technical features. Therefore, a feature defined by "first" or "second" can explicitly or implicitly includes one or more features. In descriptions of this embodiment, unless otherwise stated, "a plurality of" means two or more.

In addition, the terms, "include" and "have", mentioned in the description of this application and any variant thereof are intended to cover a non-exclusive inclusion. For example, a process, method, system, product, or device that includes a series of steps or modules is not limited to the listed steps or modules; and instead, further optionally includes a step or module that is not listed, or further optionally includes another step or module that is intrinsic to the process, method, product, or device.

In addition, in the embodiments of this application, the terms, such as "exemplary" or "for example", are used to represent giving an example, an illustration, or a description. In this application, any embodiment or design solution described by using "exemplary" or "for example" should not be explained as being more preferred or having more advantages than another embodiment or design solutions. Exactly, use of the terms, such as "exemplary" or "for example", is intended to present a concept in a specific manner.

To facilitate understanding of the technical solution of this application, before a method for image fusion in the embodiments of this application is described in detail, technical terms mentioned in the embodiments of this application are first introduced.

1. Super-Resolution Reconstruction

The super-resolution reconstruction refers to generating a high-quality and high-resolution image by using one low-quality and low-resolution image or a group of low-quality and low-resolution images. The super-resolution reconstruction can include a reconstruction-based method or a learning-based method.

2. Image Signal Processing (Image Signal Processing, ISP) Module

After a camera captures a raw image (that is, an image in a RAW format), an electronic device can transmit the raw image to the ISP module. The RAW format is a format that is unprocessed and uncompressed. Then, the ISP module can analyze the raw image, and check a density gap between adjacent pixels in the image. Next, the ISP module can properly process the raw image by using a preset adjustment algorithm in the ISP module, so as to improve the quality of images captured by the camera.

After the technical terms mentioned in the embodiments of this application are described, conventional technologies are described below.

With the development of electronic technologies, an electronic device (such as a mobile phone, a tablet computer, or a smart watch) has an increasing quantity of functions. Using a mobile phone as an example, the mobile phone may be equipped with a plurality of cameras such as a main camera, a telephoto camera, and a wide-angle camera. The mobile phone can use different cameras to capture images in a same shooting scenario, so as to obtain images with different features.

In the conventional technology, when a user captures different images (such as a main image, a telephoto image, and a wide-angle image) in a same scenario through an electronic device, the user needs to switch a shooting mode of the electronic device to obtain different images in the same scenario. The main image is an image captured by the electronic device through the main camera, the telephoto image is an image captured by the electronic device through the telephoto camera, and the wide-angle image is an image captured by the electronic device through the wide-angle camera.

For example, as shown in (a) in FIG. 1, when the shooting mode of the electronic device is a normal shooting mode, the electronic device can capture a main image 101 through the main camera. Then, in response to a switching operation performed by the user, the electronic device can switch the shooting mode to a telephoto shooting mode shown in (b) in FIG. 1. Then, the electronic device can capture a telephoto image 102 through the telephoto camera. Then, in response to a switching operation performed by the user, the electronic device can switch the shooting mode to a wide-angle shooting mode shown in (c) in FIG. 1. Then, the electronic device can capture a wide-angle image 103 through the wide-angle camera.

However, in the foregoing solution, the electronic device needs to respond to a plurality of operations performed by the user before capturing a plurality of images with different features. The shooting process of the electronic device is relatively cumbersome, which affects the shooting experience of the user.

Therefore, the embodiments of this application provide an image fusion method. In the method, the electronic device can capture a main image, a telephoto image, and a wide-angle image respectively through the main camera, the telephoto camera, and the wide-angle camera at the same moment in response to a shooting operation performed by the user. Then, the electronic device can perform super-resolution reconstruction on the main image and the wide-angle image, and perform image fusion on the telephoto image, the super-resolution reconstructed main image, and the super-resolution reconstructed wide-angle image to obtain a target image.

It should be noted that, an image captured by the electronic device through a camera in the embodiments of this application may be an image obtained after the ISP module processes the raw image captured by the camera. That is, the image captured by the electronic device through the main camera is an image obtained after the ISP module processes a raw image captured by the main camera. The image captured by the electronic device through the telephoto camera is an image obtained after the ISP module processes a raw image captured by the telephoto camera. The image captured by the electronic device through the wide-angle camera is an image obtained after the ISP module processes a raw image captured by the wide-angle camera. Optionally, in the embodiments of this application, an image captured by the electronic device through the camera may be a raw image (that is, an image in a RAW format), which is not limited in the embodiments of this application. An image in the RAW format is an image that records original information of a camera sensor, and also records some metadata (an ISO setting, a shutter speed, an aperture value, white balance, and the like) generated by capturing the image by the camera, and the image is not processed by the IPS module. ISO is an acronym for International Organization for Standardization (International Organization for Standardization).

It should be noted that, that the electronic device captures a main image, a telephoto image, and a wide-angle image respectively through the main camera, the telephoto camera, and the wide-angle camera at the same moment means that a moment (such as a first moment) at which the main camera captures the main image, a moment (such as a second moment) at which the telephoto camera captures the telephoto image, and a moment (such as a third moment) at which the wide-angle camera captures the wide-angle image are the same. Alternatively, a time difference between the first moment and the second moment, a time difference between the first moment and the third moment, and a time difference between the second moment and the third moment are all the small (for example, the time differences are all less than 1 mm, 0.5 mm, 2 mm, or the like).

It may be understood that the target image is obtained based on fusion of the main image, the telephoto image, and the wide-angle image. Therefore, the target image obtained by fusion has features of the main image, the telephoto image, and the wide-angle image. For example, the target image has the feature in the main image that the overall image is relatively clear, also has the feature of being locally clear in the telephoto image, and further has the feature of having a relatively large viewing angle in the wide-angle photo. In addition, the electronic device only needs to respond to one shooting operation performed by the user before taking a target picture. In this way, a process of capturing a plurality of images with different features can be simplified and the shooting experience of the user can be improved.

For example, the electronic device in the embodiments of this application may be a device such as a tablet computer, a mobile phone, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (AR) virtual reality (VR) device, or an in-vehicle device. A specific form of the electronic device is not particularly limited in the embodiments of this application.

Figure 2A:
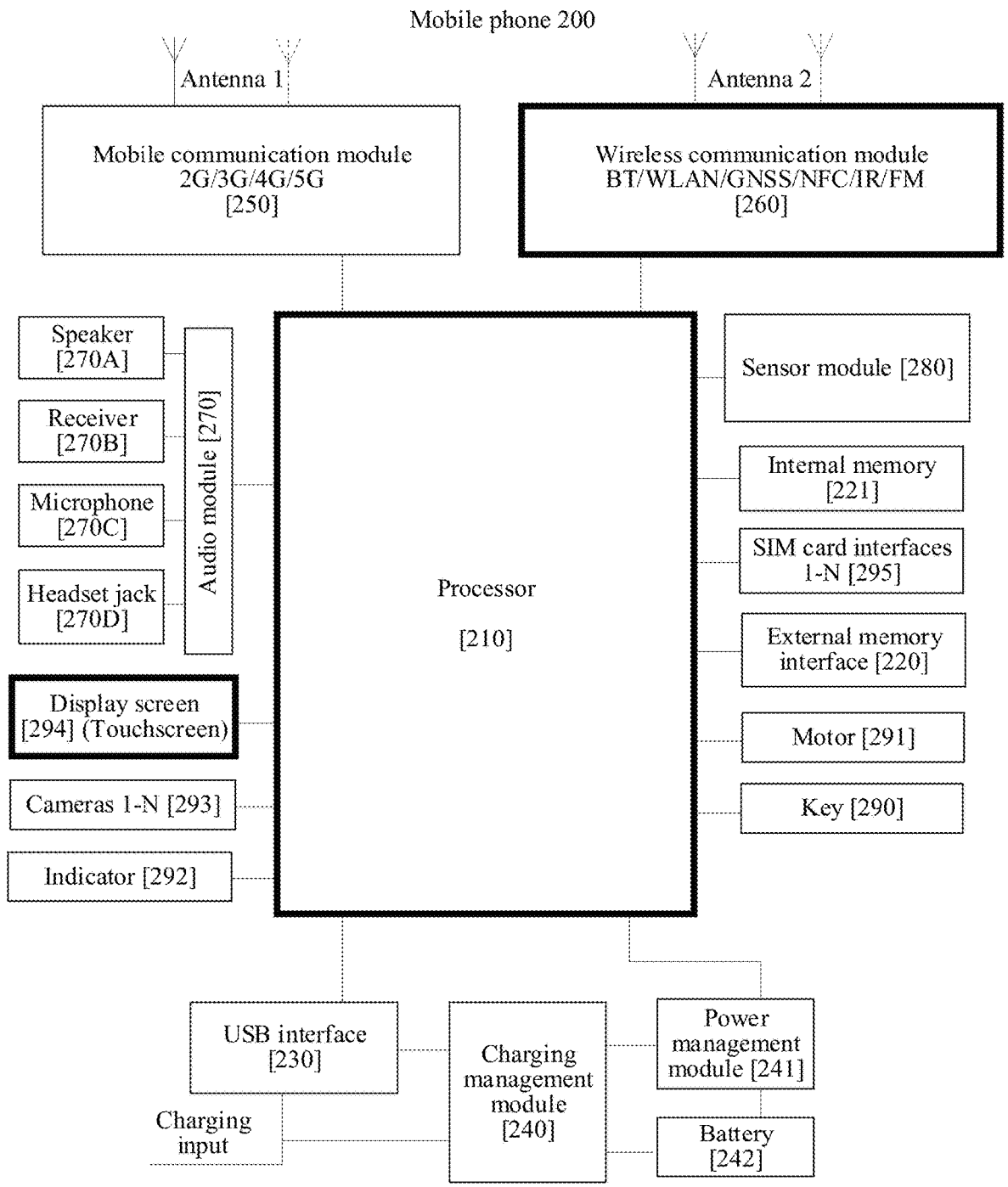
FIG. 2A is a schematic diagram of a hardware structure of an electronic device according to an embodiment of this application.

The image fusion method provided in this application may be performed by an image fusion apparatus, and the image fusion apparatus may be the electronic device shown in FIG. 2A. In addition, the execution apparatus may also be a central processing unit (Central Processing Unit, CPU) of the electronic device, or a control module in the electronic device for fusing images. In the embodiments of this application, the image fusion method provided in the embodiments of this application is described by using an example in which the image fusion method is performed by an electronic device.

Referring to FIG. 2A, in this application, an electronic device provided in this application is described by using an example in which the electronic device is a mobile phone 200 shown in FIG. 2A. The mobile phone 200 shown in FIG. 2A is merely an example of the electronic device, and the mobile phone 200 may include more components or fewer components than those shown in the figure, or two or more components may be combined, or a different component deployment may be used. The various components shown in FIG. 2A may be implemented in hardware including one or more signal processing circuits and/or application-specific integrated circuits, software, or a combination of hardware and software.

As shown in FIG. 2A, the mobile phone 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, and an audio module 270, a speaker 270A, a phone receiver 270B, a microphone 270C, a headset jack 270D, a sensor module 280, a key 290, a motor 291, an indicator 292, a camera 293, a display screen 294, a subscriber identity module (subscriber identity module, SIM) card interface 295, and the like.

The sensor module 280 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like.

The processor 210 may include one or more processing units. For example, the processor 210 may include a memory, a video codec, a baseband processor, a neural-network processing unit (neural-network processing unit, NPU), and/or the like. Different processing units may be independent devices, or may be integrated into one or more processors.

The controller may be a nerve center and a command center of the mobile phone 200. The controller may generate an operation control signal according to an instruction operation code and a timing signal, to complete the control of fetching and executing an instruction.

A memory may be further configured in the processor 210, to store instructions and data. In some embodiments, the memory in the processor 210 is a cache.

In some embodiments, the processor 210 may include one or more interfaces. The interface may include interfaces such as an inter-integrated circuit (inter-integrated circuit, I2C) interface, a subscriber identity module (subscriber identity module, SIM) interface, a universal serial bus (universal serial bus, USB) interface, and/or the like.

It may be understood that the schematic interface connection relationships between the modules in this embodiment are merely illustrative descriptions, and do not constitute a structural limitation on the mobile phone 200. In some other embodiments, the mobile phone 200 may also adopt an interface connection manner different from that in the foregoing embodiment, or adopt a combination of a plurality of interface connection manners.

The charging management module 240 is configured to receive a charging input from a charger. The charger may be a wireless charger or may be a wired charger. When charging the battery 242, the charging management module 240 may further supply power to the electronic device through the power management module 241.

The power management module 241 is configured to connect to the battery 242, the charging management module 240, and the processor 210. The power management module 241 receives input from the battery 242 and/or the charging management module 240, to supply power to the processor 210, the internal memory 221, an external memory, the display screen 294, the camera 293, the wireless communication module 260, and the like. In some embodiments, the power management module 241 and the charging management module 240 may also be disposed in a same component.

A wireless communication function of the mobile phone 200 may be implemented by using the antenna 1, the antenna 2, the mobile communication module 250, the wireless communication module 260, the modem processor, the baseband processor, and the like. In some embodiments, the antenna 1 and the mobile communication module 250 of the mobile phone 200 are coupled, and the antenna 2 and the wireless communication module 260 of the electronic device 200 are coupled, so that the mobile phone 200 can communicate with a network and another device by using a wireless communication technology.

The antenna 1 and the antenna 2 are configured to transmit and receive an electromagnetic wave signal. Each antenna of the mobile phone 200 may be configured to cover one or more communication frequency bands. Different antennas may also be multiplexed to improve utilization of the antennas. The mobile communication module 250 may provide a solution to wireless communication, such as 2G/3G/4G/5G, applicable to the mobile phone 200. The mobile communication module 250 may include at least one filter, a switch, a power amplifier, a low noise amplifier (low noise amplifier, LNA), and the like. The mobile communication module 250 may further amplify a signal modulated by the modem processor, and convert the signal into an electromagnetic wave for radiation through the antenna 1. In some embodiments, at least some function modules of the mobile communication module 250 may be arranged in the processor 210.

The wireless communication module 260 may provide a solution to wireless communication applicable to the mobile phone 200, for example, a wireless local area network (wireless local area networks, WLAN) (for example, a wireless fidelity (wireless fidelity, Wi-Fi) network), frequency modulation (frequency modulation, FM), and an infrared (infrared, IR) technology. For example, in the embodiments of this application, the mobile phone 200 can access the Wi-Fi network through the wireless communication module 260. The wireless communication module 260 may be one or more components into which at least one communication processing module is integrated.

The mobile phone 200 implements a display function by using the GPU, the display screen 294, the application processor, and the like. The GPU is a microprocessor for image processing, and is connected to the display screen 294 and the application processor.

The display screen 294 is configured to display an image, a video, and the like. The display screen 294 includes a display panel. For example, in the embodiments of this application, the display screen 294 can be configured to display a gallery interface, a shooting interface, and the like.

The mobile phone 200 can implement a shooting function by using the ISP, the camera 293, the video codec, the GPU, the display screen 294, the application processor, and the like. The ISP is configured to process data fed back by the camera 293. The camera 293 is configured to capture a static image or a video. In some embodiments, the mobile phone 200 may include one or N cameras 293, and N is a positive integer greater than 1.

In this embodiment of this application, the N cameras 293 can include: a main camera, a telephoto camera, and a wide-angle camera. Optionally, the N cameras 293 can further include at least one camera such as an infrared camera, a depth camera, or a black-and-white camera. Features (that is, advantages and disadvantages) and applicable scenarios of each of the foregoing cameras are briefly introduced below.

(1) Main camera: The main camera has features such as a large amount of admitted light, a high resolution, and a moderate field of view. The main camera is generally used as a default camera for the electronic device (such as a mobile phone). That is, the electronic device (such as a mobile phone) can start the main camera by default in response to an operation performed by the user for starting a "Camera" application, and display the image captured by the main camera on a preview interface.

(2) Telephoto camera: The telephoto camera has a relatively long focal length and is suitable for shooting a subject (that is, a distant object) that is far away from the mobile phone. However, the telephoto camera has a relatively small amount of admitted light. If an image is captured by using the telephoto camera in a dim scenario, the image quality may be affected due to an insufficient amount of admitted light. In addition, the telephoto camera has a relatively small field of view, and is not suitable for capturing an image of a relatively large scene, that is, is not suitable for shooting a relatively large subject (such as a building or a landscape).

(3) Wide-angle camera: The wide-angle camera has a relatively large field of view and is suitable for shooting a relatively large subject (such as a landscape). However, a focal length of the wide-angle camera is relatively short. When the wide-angle camera captures an object at a relatively small distance, the object in the captured wide-angle image is prone to distortion (for example, the object in the image becomes wider and flatter than the original object).

(4) Black and white camera: Because the black and white camera has no filter, compared with a color camera, the black and white camera has a relatively large amount of admitted light. In addition, a focusing speed of the black and white camera is faster than a focusing speed of the color camera. However, images captured by the black and white camera can only present different levels of grayscale, and cannot present true colors of the subject. It should be noted that, the main camera and telephoto camera are both color cameras.

It should be noted that, the field of view in the embodiments of this application includes a horizontal field of view and a vertical field of view.

The external memory interface 220 may be configured to connect to an external storage card such as a micro SD card, to expand a storage capability of the mobile phone 200. The external storage card communicates with the processor 210 by using the external memory interface 220, so as to implement a data storage function. For example, a file, such as music or a video, is stored in the external storage card.

The internal memory 221 may be configured to store computer executable program code. The executable program code includes instructions. The processor 210 runs the instructions stored in the internal memory 221, to execute various function applications and data processing of the mobile phone 200. For example, in this embodiment of this application, the processor 210 can execute the instructions stored in the internal memory 221, and the internal memory 221 may include a program storage region and a data storage region.

The program storage region may store an operating system, an application required by at least one function (for example, a sound playback function or an image playback function), and the like. The data storage region may store data (for example, audio data and an address book) and the like created when the mobile phone 200 is used. In addition, the internal memory 221 may include a high-speed random access memory, or may include a non-volatile memory such as at least one magnetic disk memory, a flash memory, or a universal flash storage (universal flash storage, UFS).

The mobile phone 200 may implement an audio function by using the audio module 270, the speaker 270A, the phone receiver 270B, the microphone 270C, the headset jack 270D, the application processor, and the like, for example, music playback or recording.

A key 290 includes a power key, a volume key, and the like. The key 290 may be a mechanical key, or a touch-type key. The motor 291 may generate a vibration prompt. The motor 291 may be configured to provide a vibration prompt for an incoming call, and may be further configured to provide a touch vibration feedback. The indicator 292 may be an indicator light, may be configured to indicate a charging state and a battery change, and may be further configured to indicate a message, a missed call, a notification, and the like. The SIM card interface 295 is configured to connect to a SIM card. The SIM card may be inserted into the SIM card interface 295 or plugged out from the SIM card interface 295, to come into contact with or be separated from the mobile phone 200. The mobile phone 200 may support one or N SIM card interfaces, where N is a positive integer greater than 1. The SIM card interface 295 may support a Nano SIM card, a Micro SIM card, a SIM card, or the like.

Although not shown in FIG. 2A, the mobile phone 200 may further include a flash, a mini projection apparatus, a near field communication (near field communication, NFC) apparatus, and the like. Details are not described herein.

It may be understood that the structure illustrated in this embodiment does not constitute a specific limitation on the mobile phone 200. In some other embodiments, the mobile phone 200 may include more or fewer components than those shown in the figure, or some components may be combined, or some components may be split, or components are arranged in different manners. The components shown in the figure may be implemented by hardware, software, or a combination of software and hardware.

Methods in the following embodiments may all be implemented in the electronic device having the foregoing hardware structure. In the following embodiments, the electronic device including the hardware structure is used as an example to describe the method of this embodiment of this application.

In this embodiment of this application, the electronic device can capture a first image through the first camera, a second image through the second camera, and a third image through the third camera in response to a shooting operation performed by the user. The field of view of the third camera is greater than the field of view of the first camera, and the field of view of the first camera is greater than the field of view of the second camera.

It should be noted that, the field of view of the third camera being greater than the field of view of the first camera means that a horizontal field of view of the third camera is greater than a horizontal field of view of the first camera, and/or a vertical field of view of the third camera is greater than a vertical field of view of the first camera. The field of view of the first camera being greater than the field of view of the second camera means that a horizontal field of view of the first camera is greater than a horizontal field of view of the second camera, and/or a vertical field of view of the first camera is greater than a vertical field of view of the second camera. For example, the third camera is a wide-angle camera, the first camera is a main camera, and the second camera is a telephoto camera.

A viewfinder coverage in which the first camera captures the first image is a first viewfinder coverage, a viewfinder coverage in which the second camera captures the second image is a second viewfinder coverage, and a viewfinder coverage in which the third camera captures the third image is a third viewfinder coverage. The third viewfinder coverage is greater than the first viewfinder coverage, and the first viewfinder coverage is greater than the second viewfinder coverage. Then, the electronic device can process the first image and the third image, and perform image fusion on the second image, the processed first image, and the processed third image to obtain a target image. In this way, the target image can have features of the first image, the second image, and the third image.

Figure 2B:
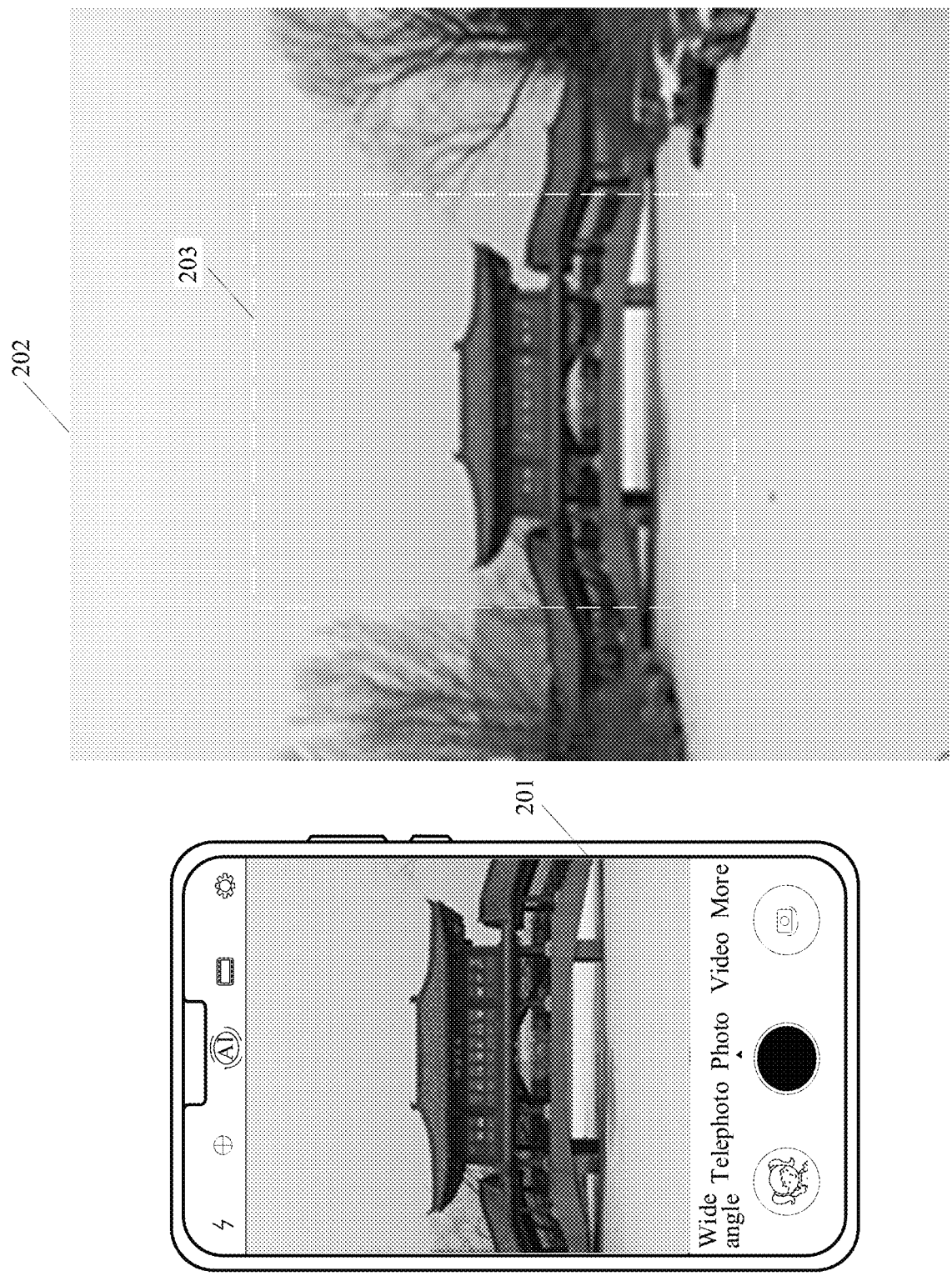
FIG. 2B is a schematic diagram of an example of a viewfinder coverage according to an embodiment of this application.

It should be noted that, in this embodiment of this application, a viewfinder coverage of the image captured by the camera refers to a range of a region that the camera can shoot. For example, as shown in FIG. 2B, the main camera can capture an image corresponding to a region 203 in a region 202. That is, regions other than the region 203 in the region 202 are not within the viewfinder coverage of the image captured by the main camera. In addition, in this embodiment of this application, the viewfinder coverage of the image corresponds to the viewfinder coverage of the image captured by the camera. For example, the viewfinder coverage of the first image can indicate a viewfinder coverage (that is, the first viewfinder coverage) in which the first camera captures the first image. In another example, the viewfinder coverage of the second image can indicate a viewfinder coverage (that is, the second viewfinder coverage) in which the second camera captures the second image.

In the following embodiments, using an example in which the first camera is a main camera, the second camera is a telephoto camera, and the third camera is a wide-angle camera, the embodiments of this application are described. When the first camera is the main camera, the first image is a main image. When the second camera is the telephoto camera, the second image is a telephoto image. When the third camera is the wide-angle camera, the third image is a wide-angle image.

Figure 3:
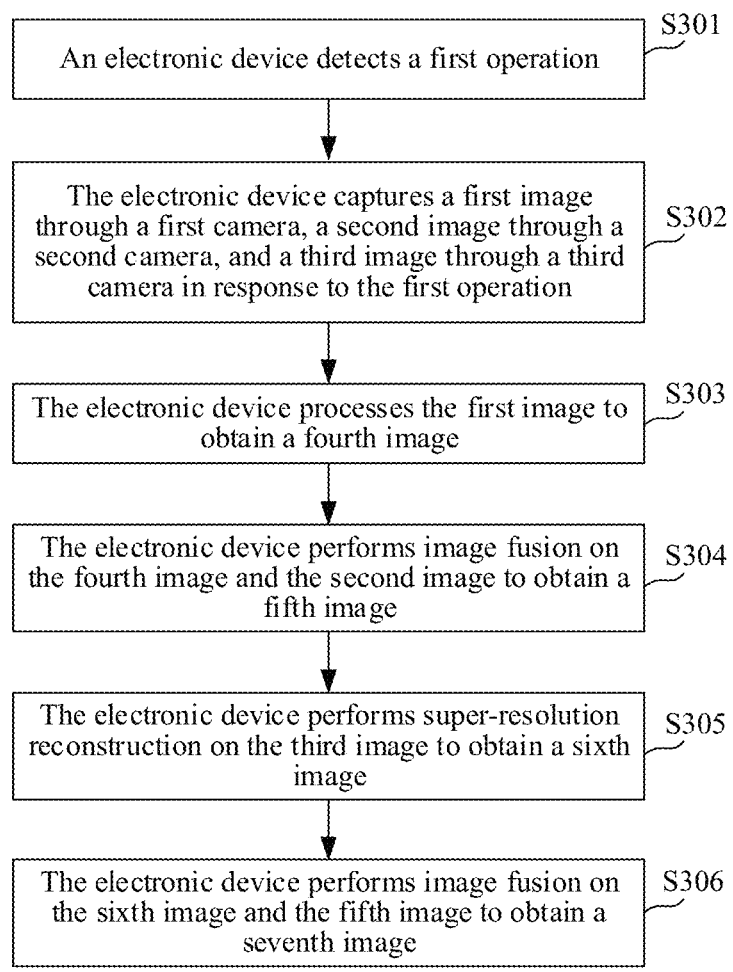
FIG. 3 is a flowchart of an image fusion method according to an embodiment of this application.

As shown in FIG. 3, the image fusion method provided in this embodiment of this application can include S301 to S306.

S301. The electronic device detects a first operation.

The first operation is an operation performed by the user, for example, a click operation. Optionally, the first operation is an operation of clicking a shooting button performed by the user. Optionally, the first operation is used for triggering the electronic device to start a shooting function. That is, the electronic device receives an operation performed by the user and can take a picture.

S302. The electronic device captures a first image through the first camera, a second image through the second camera, and a third image through the third camera in response to the first operation.

The third viewfinder coverage is greater than the first viewfinder coverage, and the first viewfinder coverage is greater than the second viewfinder coverage. Optionally, the first camera is a main camera, the second camera is a telephoto camera, and the third camera is a wide-angle camera.

In this embodiment of this application, a zoom ratio of the second image is greater than a zoom ratio of the first image, and the zoom ratio of the first image is greater than a zoom ratio of the third image. That is, among the first image, the second image, and the third image, the zoom ratio of the second image is the highest, the zoom ratio of the first image is moderate, and the zoom ratio of the third image is the lowest.

It should be noted that, the higher the zoom ratio of the image, the smaller the viewfinder coverage of the image. For example, referring to FIG. 1, assuming that a zoom ratio of the main image 101 is 1×, a zoom ratio of the telephoto image 102 is 4×, and a zoom ratio of the wide-angle image 103 is 0.5×. As shown in FIG. 1, the viewfinder coverage of the main image 101 shown in (a) in FIG. 1 is larger than the viewfinder coverage of the telephoto image 102 shown in (b) in FIG. 1. The viewfinder coverage of the main image 101 shown in (a) in FIG. 1 is smaller than the viewfinder coverage of the wide-angle image 103 shown in (c) in FIG. 1.

Figure 4:
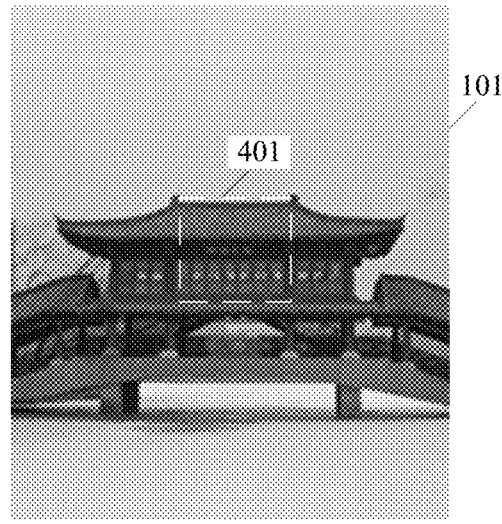
FIG. 4 is a schematic diagram of an example of an image according to an embodiment of this application.
Figure 4:
Figure 4:
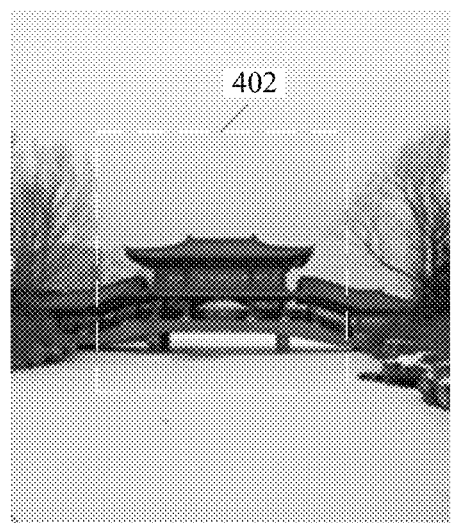

The first image includes a fourth region image, where a viewfinder coverage of the fourth region image is the same as the second viewfinder coverage. The third image includes a fifth region image, where a viewfinder coverage of the fifth region image is the same as a shooting region of the first image. For example, as shown in FIG. 4, the fourth region image 401 included in the main image 101 shown in (a) in FIG. 4 is the same as the viewfinder coverage of the telephoto image 102 shown in (b) in FIG. 4. The fifth region image 402 included in the wide-angle image 103 shown in (c) in FIG. 4 is the same as the viewfinder coverage of the main image 101.

In some embodiments, the electronic device can capture a first image through the main camera, a second image through the telephoto camera, and a third image through the wide-angle camera at the same moment in response to the first operation.

It should be noted that, the electronic device capturing the first image through the main camera, the second image through the telephoto camera, and the third image through the wide-angle camera at the same moment means that a moment (may be referred to as a first moment) at which the main camera captures the first image, a moment (may be referred to as a second moment) at which the telephoto camera captures the second image, and a moment (such as a third moment) at which the wide-angle camera captures the third image are the same; or a time difference between the first moment and the second moment, a time difference between the first moment and the third moment, and a time difference between the second moment and the third moment are all relatively small (for example, the time differences are all less than 1 mm). When there are time differences between the first moment, the second moment, and the third moment, an order in which the main camera captures the first image, the telephoto camera captures the second image, and the wide-angle camera captures the third image is not limited in this embodiment of this application.

S303. The electronic device performs super-resolution reconstruction on the first image to obtain the fourth image.

The fourth image includes the first region image, a viewfinder coverage of the first region image relative to the first camera is a fourth viewfinder coverage, the first viewfinder coverage includes the fourth viewfinder coverage, and the fourth viewfinder coverage coincides with the second viewfinder coverage. That is, the first camera can obtain, by using the fourth viewfinder coverage, an image that coincides with the viewfinder coverage of the first region image. For example, the first viewfinder coverage is a viewfinder coverage of an image 501 shown in (a) in FIG. 5, and the fourth viewfinder coverage is a viewfinder coverage of a first region image 502 shown in (a) in FIG. 5. In the following embodiments, for the descriptions of the viewfinder coverage of the region image, reference may be made to the descriptions of the viewfinder coverage of the first region image.

The resolution of the first region image is the same as the resolution of the second image. For example, as shown in (a) in FIG. 5, the image 501 includes the first region image 502. A resolution of the first region image 502 is the same as a resolution of the second image 102 shown in (b) in FIG. 5. For example, the resolution of the first region image is 20 million pixels, and the resolution of the second image is 20 million pixels.

It should be noted that, in this embodiment of this application, resolutions of two images (for example, an image A and an image B) being the same means that the quantity of pixels in a horizontal direction in the image A is the same as the quantity of pixels in a horizontal direction in the image B, and the quantity of pixels in a vertical direction in the image A is the same as the quantity of pixels in a vertical direction in the image B. For example, the resolution of the first region image is 5000×4000, and the resolution of the second image is 5000×4000.

It should be noted that, specifically, for a manner in which the electronic device performs super-resolution reconstruction on the first image, reference may be made to a method for performing super-resolution reconstruction on an image in the conventional technology, and details are not described again in this embodiment of this application. For example, the electronic device can adjust the resolution of the first image by using a bilinear interpolation algorithm to obtain the fourth image.

In some embodiments, to ensure that the resolution of the first region image is the same as the resolution of the second image, the electronic device can perform super-resolution reconstruction on the first image by using a relationship between the zoom ratio of the first image and the zoom ratio of the second image to obtain the fourth image.

In a possible implementation, the electronic device can perform super-resolution reconstruction at a first ratio on the first image to obtain the fourth image. The first ratio is a ratio between the zoom ratio of the first image and the zoom ratio of the second image. A resolution of the fourth image is greater than the resolution of the first image.

In a possible design, the electronic device can calculate the resolution of the fourth image according to the zoom ratio of the first image, the zoom ratio of the second image, and the resolution of the second image. For example, the electronic device can obtain the resolution of the fourth image through formula 1:

$$M = (p \div q)^2 \times b \qquad \text{formula 1}$$

where M is the resolution of the fourth image, p is the zoom ratio of the second image, q is the zoom ratio of the first image, b is the resolution of the second image, and (p÷q) is the first ratio.

Figure 5:
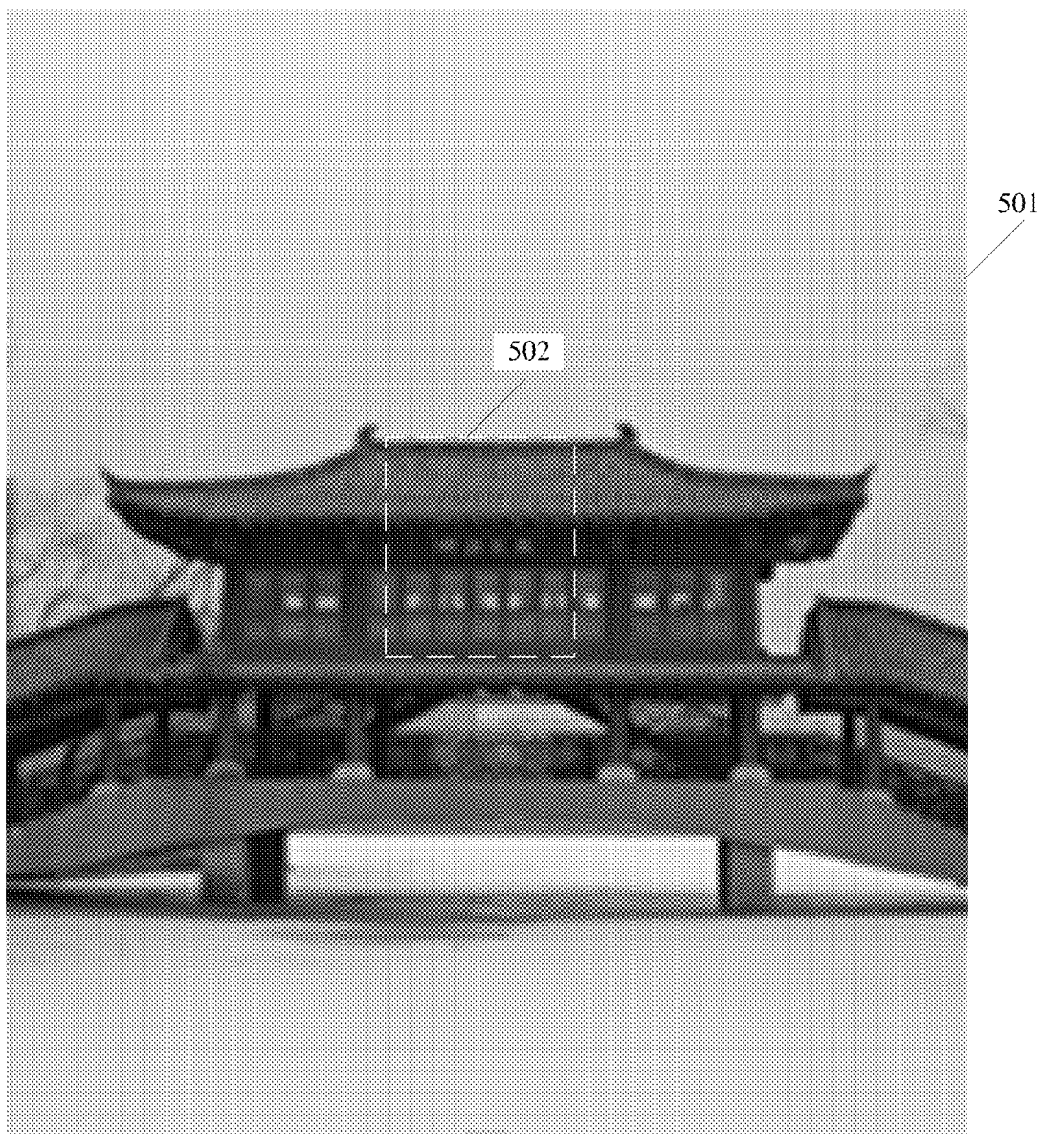
FIG. 5 is a schematic diagram of an example of another image according to an embodiment of this application.
Figure 5:
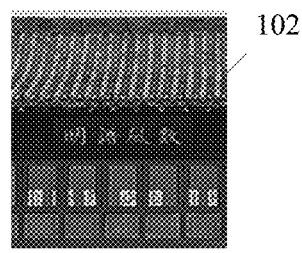

For example, referring to FIG. 1 and FIG. 5, assuming that the zoom ratio of the telephoto image 102 is 4×, the zoom ratio of the main image 101 is 1×, and the resolution of the telephoto image 102 is 20 million pixels, the electronic device can determine the resolution of the image 501 with reference to the formula 1 as:

$$M = (4 \div 1)^2 \times 2000 = 32000$$

That is, the resolution of the image 501 is 320 million pixels.

S304. The electronic device performs image fusion on the second image and the fourth image to obtain a fifth image.

The fifth image includes a seventh region image. A viewfinder coverage of the seventh region image is the same as a second viewfinder coverage (or a viewfinder coverage of a fourth region image).

In this embodiment of this application, the electronic device can perform fusion on the second image and the fourth image by using an image fusion algorithm, to obtain the fifth image. The image fusion algorithm is not limited in this embodiment of this application. For example, the image fusion algorithm may be a high and low frequency information fusion algorithm. In another example, the image fusion algorithm may be a multi-scale fusion algorithm. In another example, the electronic device can perform fusion on the second image and the fourth image through a preset model to obtain the fifth image. The preset model may be a visual geometry group network (Visual Geometry Group Network, VGG) model, an inception model, a ResNET model, or the like. This is not limited in this embodiment of this application.

It may be understood that because the resolution of the first region image in the fourth image is the same as the resolution of the second image, and the viewfinder coverage of the first region image is the same as the second viewfinder coverage, the electronic device can perform image fusion on the second image and the fourth image.

It may be understood that the second image has the feature that a local image (that is, an image of a distant object) is clear, and the fourth image has the feature that the overall image is relatively clear. The electronic device performs image fusion on the second image and the fourth image, and can combine the features of the second image and the fourth image to obtain a fifth image of which the overall image has a relatively high definition of an and a local image has a relatively high definition. That is, the fifth image combines the features of the main image and the telephoto image. In this way, the quality of images captured by the electronic device can be improved.

S305. The electronic device performs super-resolution reconstruction on the third image to obtain the sixth image.

The sixth image includes a second region image, a viewfinder coverage of the second region image relative to the third camera is a fifth viewfinder coverage, the third viewfinder coverage includes the fifth viewfinder coverage, and the viewfinder coverage of the second region image (that is, the fifth viewfinder coverage) coincides with the viewfinder coverage of the first image (or the fifth image). For example, as shown in (a) in FIG. 6, the fifth viewfinder coverage is the viewfinder coverage of the second region image 602.

In this embodiment of this application, the resolution of the second region image is the same as the resolution of the fifth image. For example, as shown in (a) in FIG. 6, the sixth image 601 includes the second region image 602. A resolution of the second region image 602 is the same as a resolution of the fifth image 501 shown in (b) in FIG. 6. For example, the resolution of the second region image is 320 million pixels, and the resolution of the fifth image is 320 million pixels.

It should be noted that, for the descriptions of the process in which the electronic device performs super-resolution reconstruction on the third image to obtain the sixth image, reference may be made to the descriptions about that the electronic device performs super-resolution reconstruction on the first image to obtain the fourth image in S303, and details are not described herein again. For example, the electronic device can adjust the resolution of the third image by using a bilinear interpolation algorithm to obtain the sixth image.

In some embodiments, to ensure that the resolution of the second region image is the same as the resolution of the fifth image, the electronic device can perform super-resolution reconstruction on the third image by using a relationship between the zoom ratio of the first image and the zoom ratio of the third image to obtain the sixth image.

In a possible implementation, the electronic device can perform super-resolution reconstruction at a second ratio on the third image to obtain the sixth image. The second ratio is a ratio between the zoom ratio of the first image and the zoom ratio of the third image. A resolution of the sixth image is greater than the resolution of the third image.

In a possible design, the electronic device can calculate the resolution of the sixth image according to the zoom ratio of the first image, the zoom ratio of the third image, and the resolution of the fifth image. For example, the electronic device can obtain the resolution of the sixth image through a formula 2:

$$N = (k \div j)^2 \times c \qquad \text{formula 2}$$

where N is the resolution of the sixth image, k is the zoom ratio of the first image, j is the zoom ratio of the third image, c is the resolution of the fifth image, and (k÷j) is the second ratio.

Figure 6:
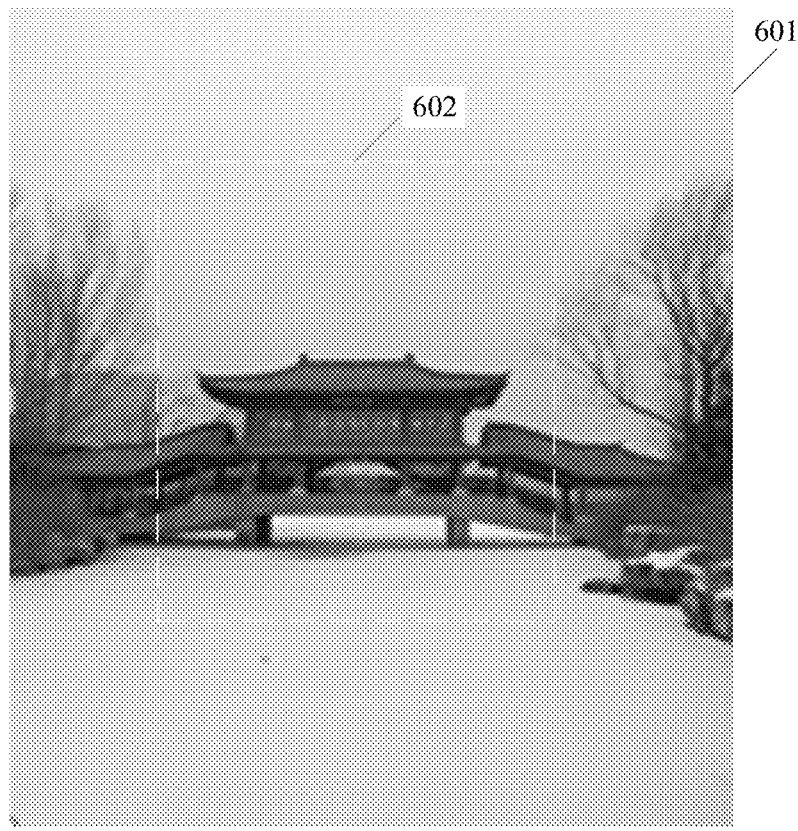
FIG. 6 is a schematic diagram of an example of another image according to an embodiment of this application.
Figure 6:
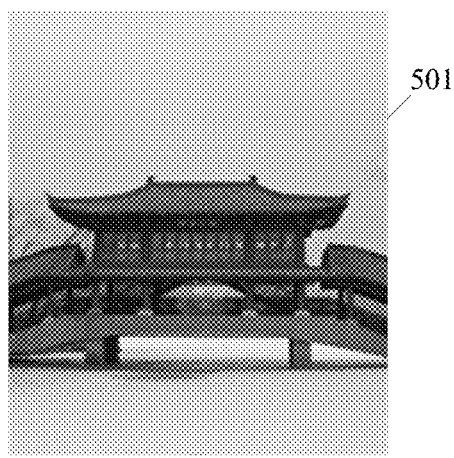

For example, referring to FIG. 1 and FIG. 6, assuming that the zoom ratio of the main image 101 is 1×, the zoom ratio of the telephoto image 103 is 0.5×, and the resolution of the fifth image is 320 million pixels, the electronic device can determine the resolution of the sixth image 601 with reference to the formula 2 as:

$$M = (1 \div 0.5)^2 \times 32000 = 128000$$

That is, the resolution of the sixth image 601 is 1.28 billion pixels.

It should be noted that, an order in which the electronic device obtains the fifth image and the sixth image is not limited in this embodiment of this application. For example, the electronic device may perform S305 first, and then perform S304. In another example, the electronic device may simultaneously perform S304 and S305.

S306. The electronic device performs image fusion on the fifth image and the sixth image to obtain a seventh image.

The seventh image includes an eighth region image, where a viewfinder coverage of the eighth region image is the same as the first viewfinder coverage (or a viewfinder coverage of a fifth region image in the third image).

It should be noted that, for the descriptions of the process in which the electronic device performs image fusion on the fifth image and the sixth image to obtain the seventh image, reference may be made to the descriptions about that the electronic device performs image fusion on the second image and the fourth image to obtain the fifth image in S304, and details are not described herein again.

It should be noted that, because the resolution of the second region image in the sixth image is the same as the resolution of the fifth image, and the viewfinder coverage of the second region image is the same as the viewfinder coverage of the fifth image, the electronic device can perform image fusion on the fifth image and the sixth image.

It may be understood that the fifth image has the features that the overall image is relatively clear and that a local image (that is, an image of a distant object) is clear, and the sixth image has a relatively large viewfinder coverage. The electronic device performs image fusion on the fifth image and the sixth image, and can combines the features of the fifth image and the sixth image to obtain a seventh image of which a viewfinder coverage is relatively large, the overall image has a relatively high definition, and a local image has a relatively high definition. That is, the seventh image combines features of the main image, the telephoto image, and the wide-angle image. In this way, the quality of images captured by the electronic device can be improved.

Based on the foregoing technical solution, the electronic device receives the shooting operation performed by the user, and can separately capture a first image, a second image, and a third image respectively through the main camera, the telephoto camera, and the wide-angle camera. In addition, the electronic device can perform image processing on the first image, the second image, and the third image to obtain a seventh image, where the seventh image has the features of the images captured by different cameras. That is, by performing only one operation, the user can obtain an image with features of a plurality of images through an electronic device, so that the shooting process is simplified, and the user experience is improved.

It should be noted that, when capturing an image, the electronic device may be affected by some factors, resulting in poor quality of the captured image. For example, when the user takes a picture, if the hand shakes, the picture taken by the electronic device may be blurred. In another example, when the lighting is poor, the noise in the picture captured by the electronic device may be serious.

In some other embodiments, to improve the quality of images captured by the electronic device, the electronic device can capture the images with the assistance of an auxiliary camera (that is, a fourth camera). The auxiliary camera is not limited in this embodiment of this application. For example, the auxiliary camera may be an infrared camera. In another example, the auxiliary camera may be a black and white camera.

For example, an example in which the auxiliary camera is an infrared camera is used, that is, the electronic device captures images with the assistance of the infrared camera. The infrared camera can sense not only visible light but also infrared light. For example, the infrared light may be infrared light of 890 nanometers (nm) to 990 nm. That is, the infrared camera can perceive infrared light with a wavelength of 890 nm to 990 nm. Certainly, infrared light (that is, wavelengths of infrared light) that different infrared cameras can sense may be different. The visible light camera may also be a camera with a common wavelength band. The common wavelength band is a wavelength band in which wavelengths of the visible light are located.

In a dark scenario (for example, in the evening, at late night, or in a dark room), the intensity of the visible light is relatively low. The main camera cannot sense light, or the sensed light is weak, and consequently, cannot capture a clear image. However, the infrared light camera can sense infrared light emitted by a person or an animal with a temperature within a viewfinder coverage, and therefore, can capture an image of the person or the animal.

In view of the foregoing features of the infrared camera, when using the main camera to capture images in a dark scenario, to prevent the quality of the images from being affected by weak visible light, the electronic device uses, with the help of the advantage that the infrared camera can sense infrared light, the infrared camera as an auxiliary camera to assist the main camera to work, thereby improving the quality of the images captured by the main camera.

Figure 7:
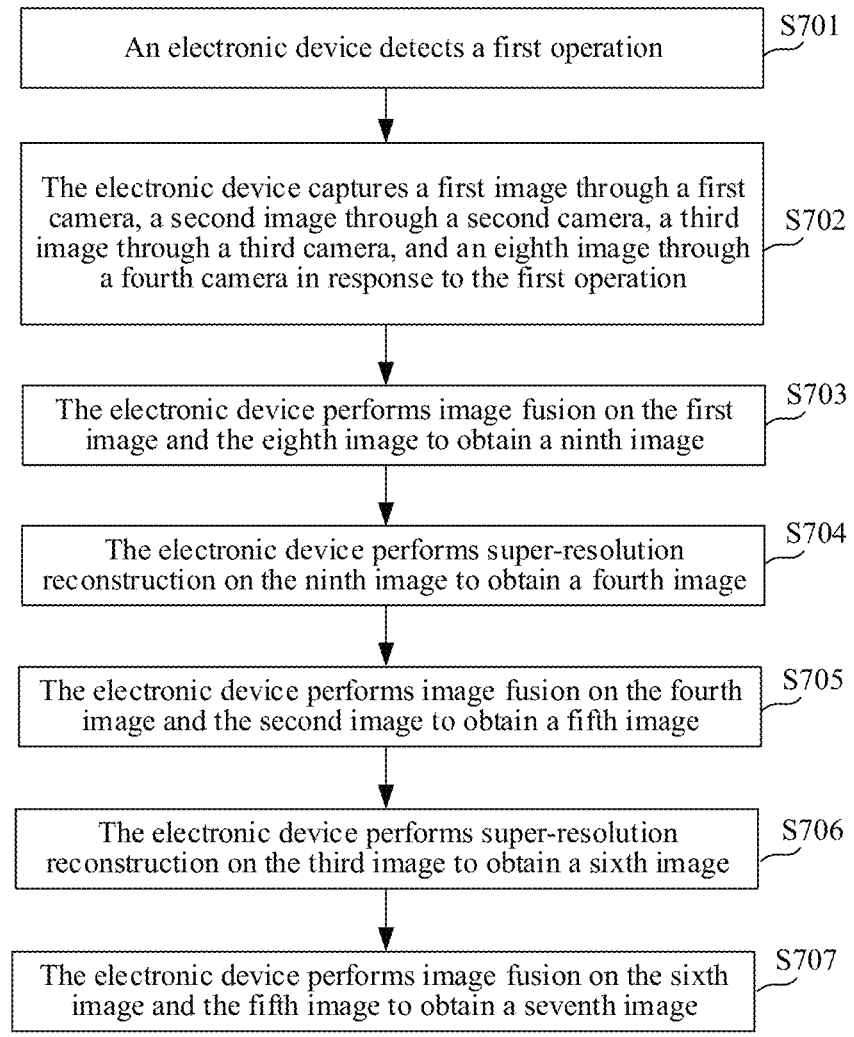
FIG. 7 is a flowchart of an image fusion method according to an embodiment of this application.

As shown in FIG. 7, the image fusion method may include S701 to S707.

S701. The electronic device detects a first operation.

It should be noted that, for the descriptions of S701, reference may be made to the descriptions of S301 in the foregoing embodiment, and details are not described herein again.

S702. The electronic device captures a first image through the first camera, a second image through the second camera, a third image through the third camera, and an eighth image through the fourth camera in response to the first operation.

The viewfinder coverage of the eighth image is the same as the first viewfinder coverage.

It should be noted that, in this embodiment of this application, the viewfinder coverage of the eighth image being the same as the first viewfinder coverage means that: a similarity between the viewfinder coverage of the eighth image and the first viewfinder coverage is 100%, or a similarity between the viewfinder coverage of the eighth image and the first viewfinder coverage is greater than a preset similarity threshold (for example, 99%, 95%, or 90%).

Figure 8:
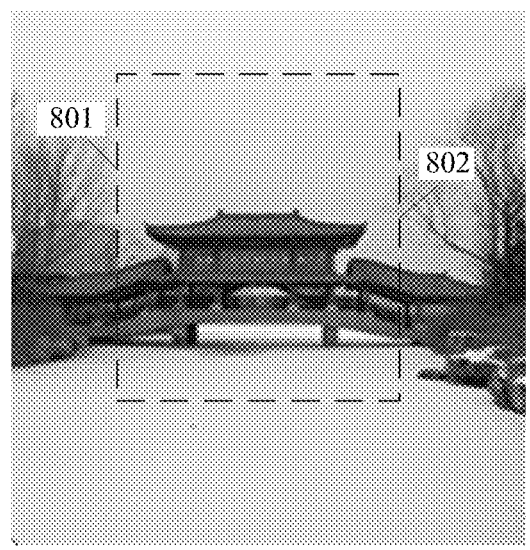
FIG. 8 is a schematic diagram of an example of another image according to an embodiment of this application.
Figure 8:
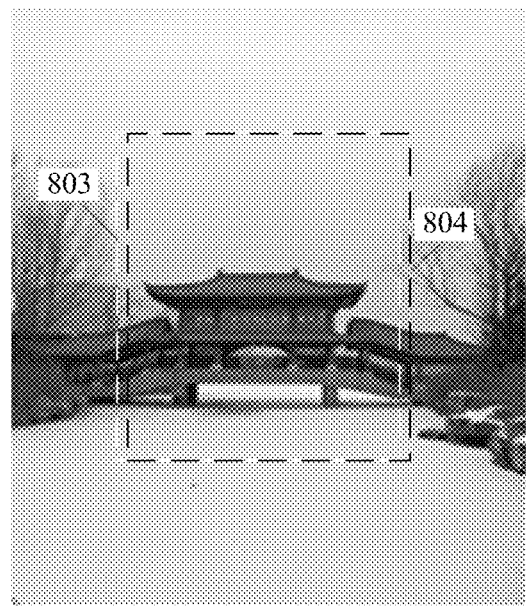

For example, as shown in (a) in FIG. 8, a region 801 is the first viewfinder coverage, a region 802 is the viewfinder coverage of the eighth image, and the region 801 is the same as the region 802. In another example, as shown in (b) in FIG. 8, a region 803 is the first viewfinder coverage, a region 804 is the viewfinder coverage of the eighth image, and the region 803 is not completely the same as the region 804.

In this embodiment of this application, the electronic device can capture the eighth image through the auxiliary camera, the first image through the main camera, the second image through the telephoto camera, and the third image through the wide-angle camera at the same moment.

It should be noted that, for the descriptions of the same moment, reference may be made to the descriptions about that the electronic device captures the first image through the main camera, the second image through the telephoto camera, and the third image through the wide-angle camera at the same moment in S302, and details are not described herein again.

S703. The electronic device performs image fusion on the first image and the eighth image to obtain a ninth image.

The viewfinder coverage of the ninth image is the same as the first viewfinder coverage. The ninth image includes a sixth region image, where a viewfinder coverage of the sixth region image is the same as the second viewfinder coverage.

It should be noted that, resolutions of the first image and the eighth image are not limited in this embodiment of this application. For example, the resolution of the first image may be greater than the resolution of the eighth image. In another example, the resolution of the first image may be equal to the resolution of the eighth image. In another example, the resolution of the first image may be less than the resolution of the eighth image.

In some embodiments, if the resolution of the first image is greater than (or equal to) the resolution of the eighth image, the electronic device can directly perform image fusion on the first image and the eighth image to obtain a ninth image.

It should be noted that, in a process in which the electronic device performs image fusion on the first image and the eighth image, the electronic device can zoom in the eighth image to a resolution the same as that of the first image.

In some other embodiments, if the resolution of the first image is less than the resolution of the eighth image, the electronic device can zoom in the first image, and the resolution of the first image that has been zoomed in is the same as the resolution of the eighth image. Then, the electronic device can perform image fusion on the enlarged first image and the eighth image to obtain a ninth image.

It should be noted that, for the descriptions of the process in which the electronic device performs image fusion on the first image and the eighth image to obtain the ninth image, reference may be made to the descriptions about that the electronic device performs image fusion on the second image and the fourth image to obtain the fifth image in S304, and details are not described herein again.

It may be understood that image fusion can improve the image quality. The electronic device performs image fusion on the first image and the eighth image, and image quality of the obtained ninth image is higher than image quality of the first image (or the eighth image). In this way, in a dark scenario or a scenario in which a subject is moving, the quality of the images captured by the electronic device can be further improved.

S704. The electronic device performs super-resolution reconstruction on the ninth image to obtain the fourth image.

It should be noted that, for the descriptions of the process in which the electronic device performs super-resolution reconstruction on the ninth image to obtain the fourth image, reference may be made to the descriptions of the process in which the electronic device performs super-resolution reconstruction on the first image to obtain the fourth image in S303, and details are not described herein again.

It may be understood that the image quality of the ninth image obtained by the electronic device through fusion is higher than image quality of the first image (or the eighth image). The electronic device performs super-resolution reconstruction on the ninth image, and the image quality of the obtained fourth image is also higher than the image quality of the first image (or the eighth image). In this way, the quality of images captured by the electronic device can be improved.

S705. The electronic device performs image fusion on the fourth image and the second image to obtain a fifth image.

It should be noted that, for the descriptions of S705, reference may be made to the descriptions of S304 in the foregoing embodiment, and details are not described herein again.

S706. The electronic device performs super-resolution reconstruction on the third image to obtain the sixth image.

It should be noted that, for the descriptions of S706, reference may be made to the descriptions of S305 in the foregoing embodiment, and details are not described herein again.

S707. The electronic device performs image fusion on the sixth image and the fifth image to obtain a seventh image.

It should be noted that, for the descriptions of S707, reference may be made to the description of S306 in the foregoing embodiment, and details are not described herein again.

Based on the foregoing technical solution, the electronic device receives the shooting operation performed by the user, and can capture a first image, a second image, a third image, and an eighth image respectively through the main camera, the telephoto camera, the wide-angle camera, and the auxiliary camera. In addition, the electronic device can perform image processing on the first image, the second image, the third image, and the eighth image to obtain a seventh image, where the seventh image has the features of the images captured by different cameras. That is, by performing only one operation, the user can obtain an image with features of a plurality of images through an electronic device, so that the shooting process is simplified, and the user experience is improved.

It should be noted that, to help the user capture an image (that is, the seventh image) with the features of the main image, the telephoto image, and the wide-angle image through the electronic device, the electronic device can set a preset shooting mode. When the shooting mode of the electronic device is the preset shooting mode, the electronic device can capture the seventh image through cameras such as the main camera, the telephoto camera, and the wide-angle camera.

Figure 9A:
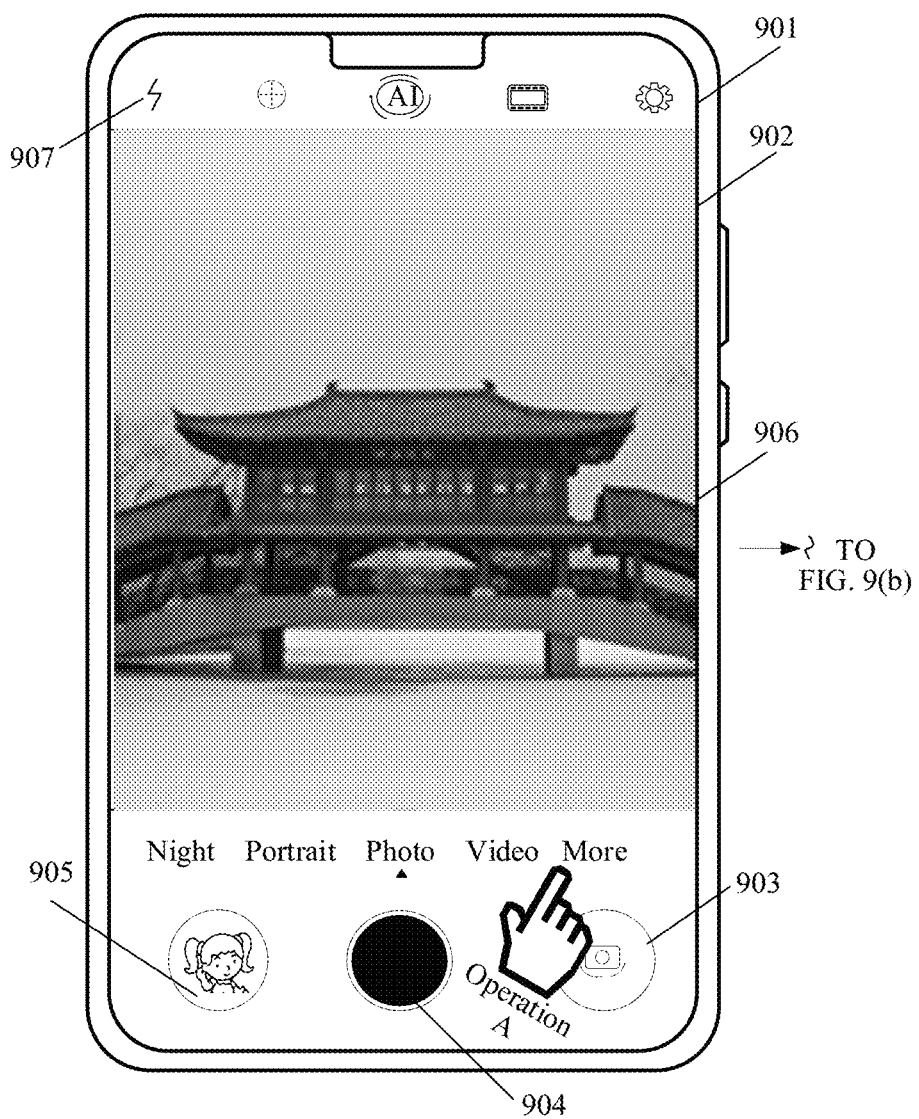
FIG. 9(a), FIG. 9(b), and FIG. 9(c) are schematic diagrams of an example of another image preview interface according to an embodiment of this application.
Figure 9B:
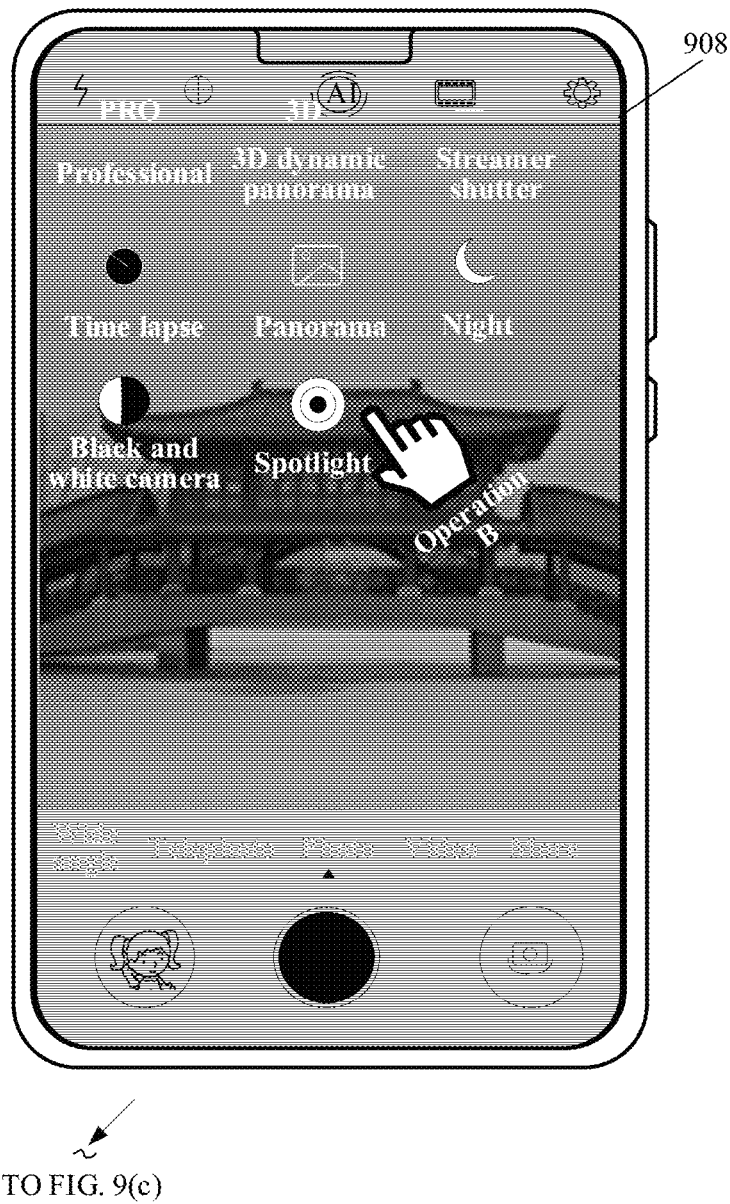
Figure 9C:
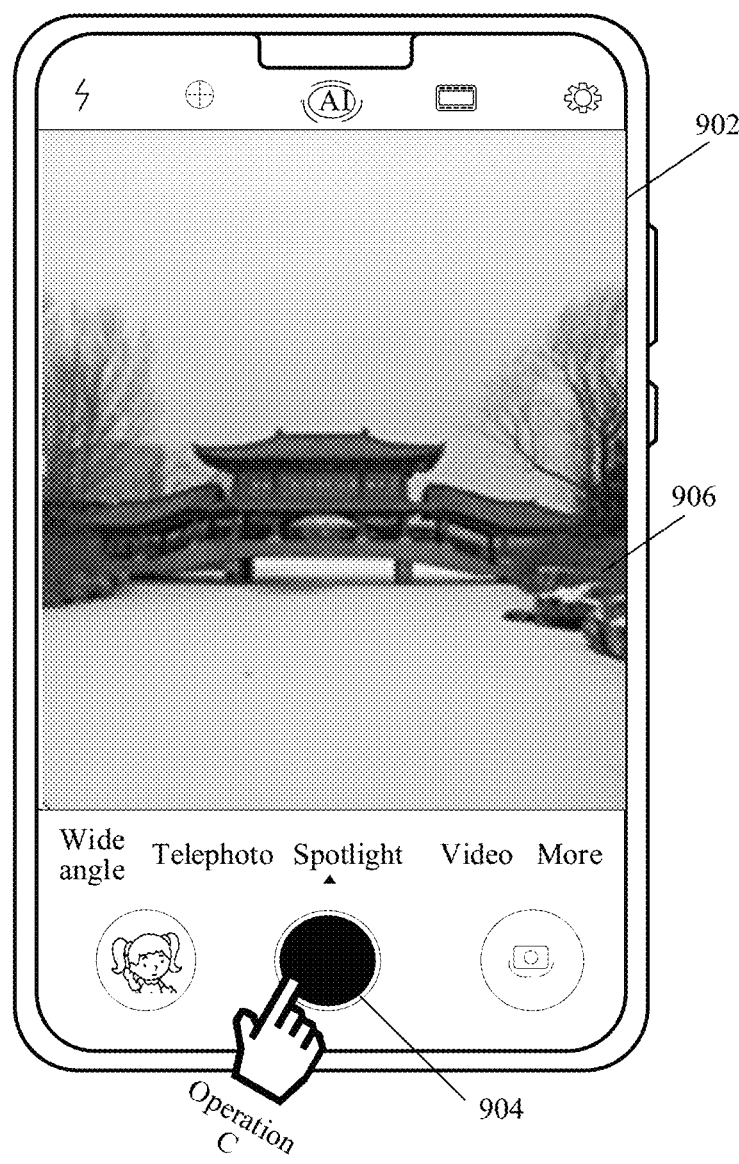

In some embodiments, before the electronic device receives the shooting operation performed by the user, the electronic device can start a shooting application and display an image preview interface. Then, the electronic device can receive a shooting mode switching operation performed by the user, where the shooting mode switching operation is used for triggering the electronic device to change the shooting mode. In response to the shooting mode switching operation, the electronic device can switch the shooting mode to a preset shooting mode. For example, as shown in FIG. 9(*a*), after the electronic device starts the shooting application, the electronic device can display an image preview interface 901. The image preview interface 901 includes a viewfinder frame 902, a camera flip button 903, a capture button 904, an album button 905, a preview image 906, a flash option 907, a "Video" option, a "Photo" option, a "More" option, and the like. Then, the electronic device can display a function option box 908 shown in FIG. 9(*b*) on an upper layer of the image preview interface 901 in response to a selection operation (for example, an operation A) performed by the user on the "More" option. The function option box 908 includes an identifier of a "Professional" mode, an identifier of a "Time lapse" mode, an identifier of a "Panorama" mode, an identifier of a "Spotlight" mode, and the like. The "spotlight" mode is a mode for capturing the seventh image. That is, when the shooting mode of the electronic device is the "Spotlight" mode, the electronic device can obtain the seventh image by capturing through a plurality of cameras. Then, in response to an operation (for example, an operation B) performed by the user on the identifier of the "Spotlight" mode, the electronic device may switch the shooting mode of the electronic device to the "Spotlight" mode (as shown in FIG. 9(*c*)).

In this way, when the shooting mode of the electronic device is the preset shooting mode, the electronic device can receive the shooting operation performed by the user, and capture the seventh image. For example, the electronic device may receive an operation C (that is, the electronic device performs S301) performed on the capture button 904 shown in FIG. 9(*c*), and captures a seventh image (that is, the electronic device performs S302 to S306).

It should be noted that, when the shooting mode of the electronic device is the preset shooting mode, the electronic device can start at least one camera to obtain a preview image.

In some embodiments, when the shooting mode of the electronic device is in the preset shooting mode, the electronic device can start the main camera, the telephoto camera, and the wide-angle camera to obtain the preview image. Optionally, the electronic device can also start the main camera, the auxiliary camera, the telephoto camera, and the wide-angle camera to obtain the preview image. The preview image is the seventh image. That is, the preview image is an image obtained after the electronic device processes the images captured by the plurality of cameras (that is, S303 to S306).

It may be understood that the electronic device starts the main camera, the telephoto camera, and the wide-angle camera to obtain the preview image, and can display the processed image (that is, the seventh image) the image preview interface. In this way, the user can intuitively understand the image effect obtained in the preset shooting mode, and the shooting experience of the user is improved.

In some other embodiments, when the shooting mode of the electronic device is in the preset shooting mode, the electronic device can start any camera (for example, the main camera, the telephoto camera, or the wide-angle camera) to capture the preview image. The preview image is an image captured by a camera started by the electronic device. For example, the electronic device can start the main camera to capture the preview image (the preview image 906 shown in FIG. 9(*a*)). In another example, the electronic device can start the wide-angle camera to capture the preview image (the preview image 906 shown in FIG. 9(*c*)). Generally, the electronic device can start the wide-angle camera to capture the preview image. In this way, the user can learn of a largest region that the electronic device shoots.

It may be understood that when the electronic device starts any camera to capture the preview image, the electronic device does not need to process the captured image, so that power consumption of the electronic device is reduced.

Figure 10:
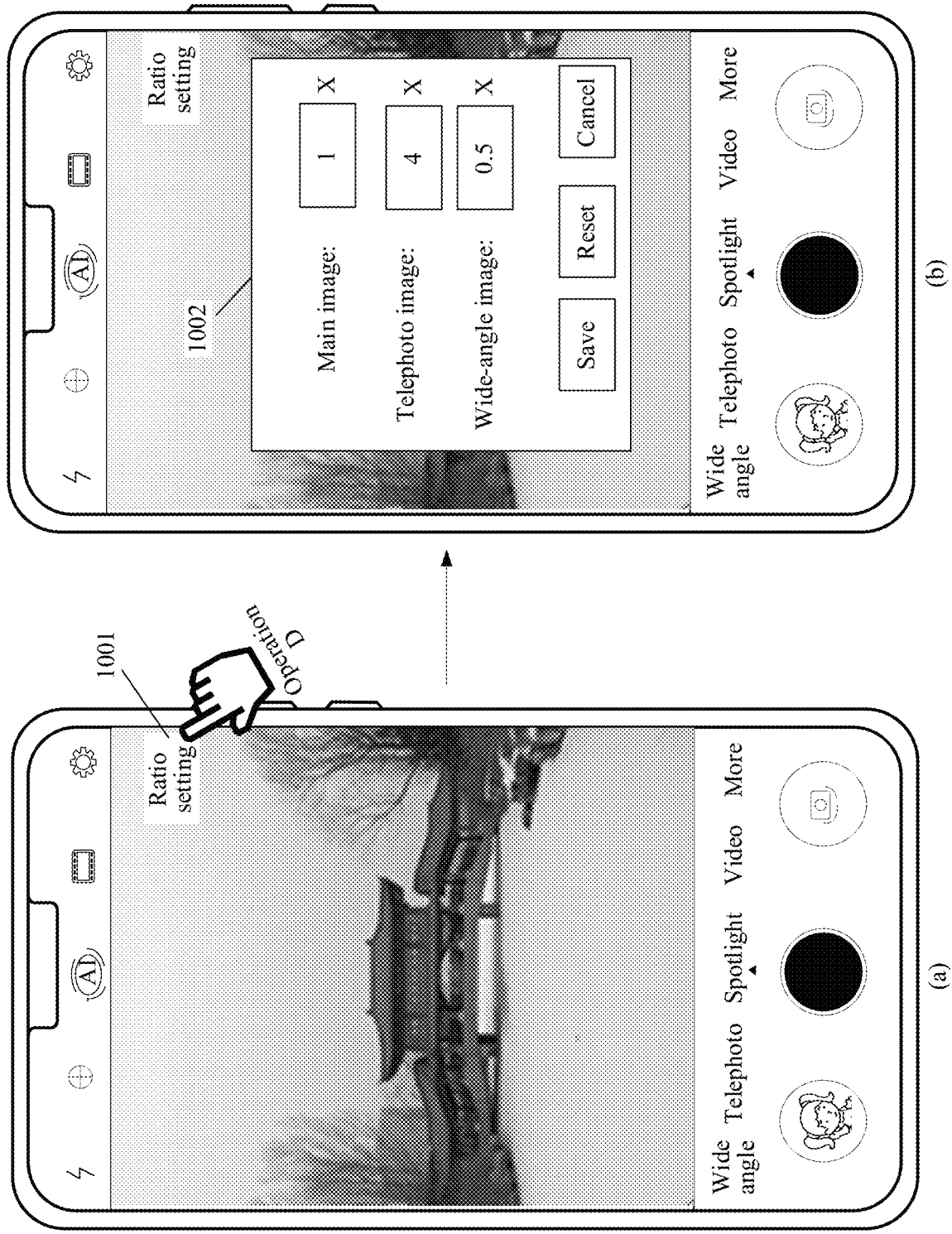
FIG. 10 is a schematic diagram of an example of a ratio setting interface according to an embodiment of this application.

In some embodiments, the electronic device can improve image quality in a user-specified region. Specifically, the electronic device can receive a ratio setting operation performed by the user, where the ratio setting operation is used for triggering the electronic device to set the zoom ratios of the first image, the second image, and the third image. In response to the ratio setting operation performed by the user, the electronic device can set a first preset ratio, a second preset ratio, and a third preset ratio, where the first preset ratio is a zoom ratio of the first image, the second preset ratio is a zoom ratio of the second image, and the third preset ratio is a zoom ratio of the third image. For example, as shown in (a) in FIG. 10, the electronic device can display a ratio setting window 1002 shown in (b) in FIG. 10 in response to an operation D performed by the user on a "Ratio setting" 1001. Alternatively, the electronic device can display a ratio setting window 1002 in response to an operation performed on the identifier of the "Spotlight" mode shown in FIG. 9(*b*). The ratio setting window 1002 includes: a ratio input box for the main image, a ratio input box for a telephoto image, and a ratio input box for a wide-angle image. The user can input the zoom ratio of the image in the ratio input box. For example, the zoom ratio (that is, the first preset ratio) of the main image is 1×, the zoom ratio (that is, the second preset ratio) of the telephoto image is 4×, and the zoom ratio (that is, the third preset ratio) of the wide-angle image is 0.5×. Optionally, the ratio setting window 1002 may further include a "Save" button, a "Reset" button, and a "Cancel" button. The "Save" button is configured to trigger the electronic device to save the zoom ratio of the image inputted by the user, and the "Reset" button is configured to trigger the electronic device to set the zoom ratio of the image to a default zoom ratio. The default zoom ratio is not limited in this embodiment of this application (for example, the default zoom ratio of the main image is 1×, the default zoom ratio of the telephoto image is 3.5×, and the default zoom ratio of the wide-angle image is 0.6×). The "Cancel" button is configured to trigger the electronic device not to display the ratio setting window 1002.

It may be understood that through the ratio setting operation, the electronic device can adjust display regions of the first image, the second image, and the third image. In this way, the electronic device can set display regions with different features in the seventh image according to the intention of the user, so that the user experience is improved.

It should be noted that, after the electronic device captures the seventh image (that is, the electronic device performs S306 or the electronic device performs S707), the electronic device can receive a second operation, where the second operation is used for triggering the electronic device to display the seventh image. The electronic device can display the seventh image in the preset mode in response to the second operation. The preset mode includes a dynamic mode and a static mode. The dynamic mode is used for instructing the electronic device to automatically zoom the seventh image with the third region image as a center. The seventh image includes the third region image, a viewfinder coverage of the third region image relative to the third camera is a sixth viewfinder coverage, the third viewfinder coverage includes the sixth viewfinder coverage, and the sixth viewfinder coverage coincides with the second viewfinder coverage. The static mode is used for instructing the electronic device to zoom the seventh image after a zoom operation inputted by the user is received.

In some embodiments, the electronic device can display the seventh image according to the dynamic mode. Specifically, the electronic device receives the second operation. The electronic device can display a dynamic image interface (that is, the first interface) in response to the second operation performed by the user, where the dynamic image interface is configured to play a dynamic screen in which the seventh image is centered on a third region image and is automatically zoomed. Specifically, the seventh image can be centered on the third region image, and the seventh image can be automatically zoomed according to zoom ratios in descending order. A maximum zoom ratio of the seventh image is a zoom ratio of the second image, and a minimum zoom ratio of the seventh image is a zoom ratio of the third image.

Figure 11:
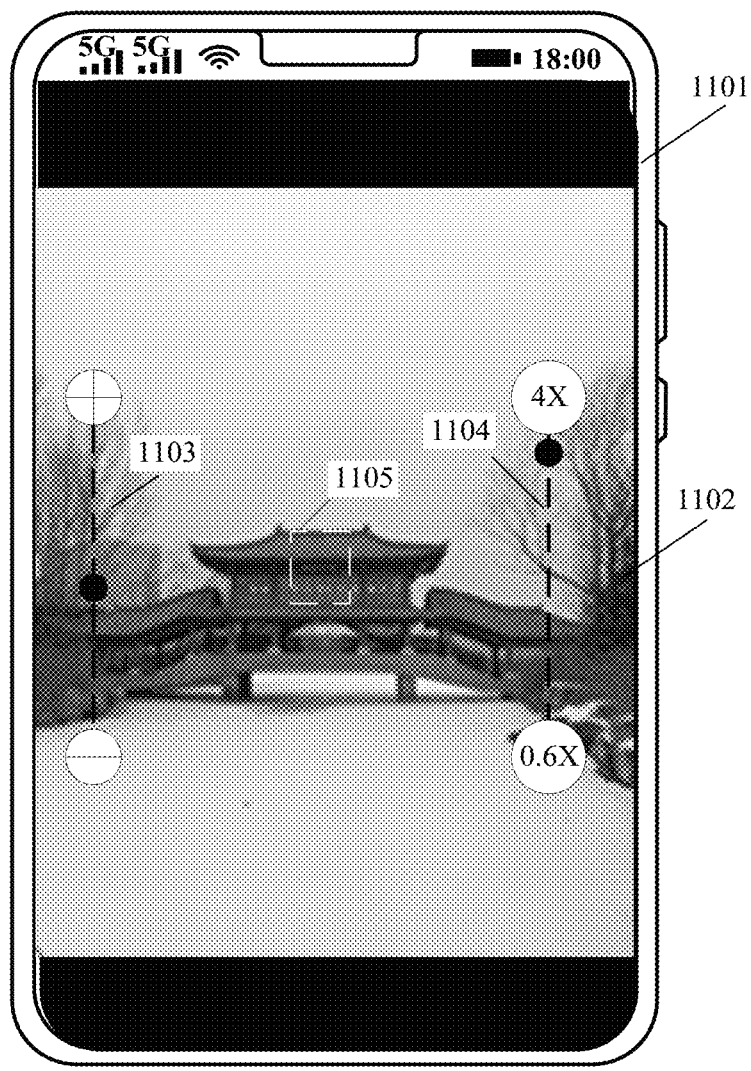
FIG. 11 is a schematic diagram of an example of an image display interface according to an embodiment of this application.

For example, as shown in FIG. 11, the electronic device can display a dynamic image interface 1101 in response to the second operation performed by the user. The dynamic image interface 1101 includes a dynamic image 1102. For the dynamic image 1102, the seventh image can be centered on the third region image 1105 and automatically zoomed according to zoom ratios in descending order. For example, the user can view the dynamic image interface on a user interface. An image corresponding to (c) in FIG. 4 presented on the user interface may be zoomed to an image in (a) in FIG. 4 presented on the user interface, and then be zoomed to an image corresponding to (b) in FIG. 4 presented on the user interface. Optionally, a zooming process of the dynamic image may be repeatedly replayed. For example, after presenting the image corresponding to (b) in FIG. 4, the user interface jumps to the image corresponding to (c) in FIG. 4 presented on the user interface, to replay such a dynamic change process, or instead of repeating, keeps still after zooming the dynamic image to the image corresponding to (b) in FIG. 4, and displays the last frame of image. A dynamic display of the dynamic image can be performed in response to that the user's finger presses any position of the dynamic image. When the user's finger leaves the screen, the long-press is ended, and the dynamic display of the dynamic image is ended. The dynamic display can also be performed in response to that the user's finger long-presses any position of the dynamic image for 2 seconds. When the user's finger leaves the screen, the long-press is ended, and the dynamic display of the dynamic image continues and is not stopped. Alternatively, a playback icon may be arranged, and the user clicks the icon to display the dynamic image. A display manner of the dynamic image and a specific operation in response to which the dynamic display is performed are not limited in this embodiment of this application. Optionally, the dynamic image interface may further include a first speed option, where the first speed option is configured to adjust a playback speed in the dynamic screen. The electronic device can adjust a playback speed of the dynamic screen in response to an adjustment operation performed by a user on the first speed option. For example, with reference to FIG. 11, the dynamic image interface 1101 further includes a first speed option 1103. For example, the first speed option 1103 can instruct the electronic device to automatically zoom the seventh image at 100 pixel/s or 20% FOV/s.

Optionally, the dynamic image interface can further include a first ratio option, where the first ratio option is configured to adjust a maximum zoom ratio of the seventh image in the first interface. A maximum magnification ratio of the seventh image is less than or equal to a second preset ratio (that is, the zoom ratio of the second image). The electronic device can adjust the maximum zoom ratio of the seventh image in response to an adjustment operation performed by the user on the first ratio option. For example, with reference to FIG. 11, the dynamic image interface 1101 further includes a first ratio option 1104. For example, when the zoom ratio of the second image is 4×, the maximum magnification ratio of the seventh image can be 4×, and can also be 3×.

It may be understood that the electronic device displays the seventh image in a dynamic mode, so that the user can view a dynamic image, which increases interest of viewing the image. In addition, the first speed option and the first ratio option can enable the user to adjust a zoom speed and a maximum magnification ratio of the image, so that the user experience is improved.

Figure 12:
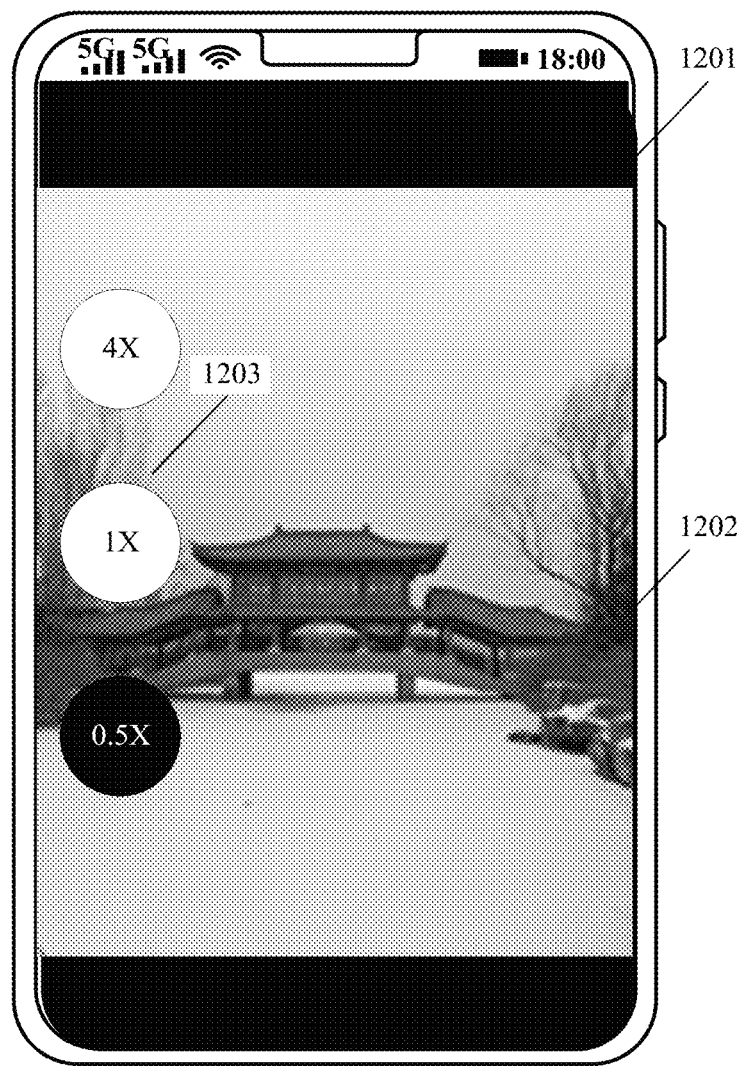
FIG. 12 is a schematic diagram of an example of another image display interface according to an embodiment of this application.

In some embodiments, the electronic device can display the seventh image according to the static mode. Specifically, the electronic device can display a static image interface (that is, the second interface) in response to the second operation performed by the user, where the static image interface includes a seventh image that cannot be automatically zoomed. Optionally, the image display interface can further include a preset ratio option, where the preset ratio option is configured to set a zoom ratio of the seventh image. The electronic device can receive a zoom ratio set by the user in the preset ratio option, and display the seventh image according to the zoom ratio set by the user. For example, as shown in FIG. 12, the image display interface 1201 displayed by the electronic device can include a seventh image 1202 and a preset ratio option 1203. For example, the preset ratio option 1203 can include a first preset ratio (for example, 1×), a second preset ratio (for example, 4×), and a third preset ratio (for example, 0.5×). That is, the electronic device can set the zoom ratio of the seventh image to 4×, 1×, or 0.5× in response to an operation performed on the preset ratio option 1203 by the user.

It may be understood that after the electronic device receives an operation performed on a preset ratio option, the electronic device can display an image zoomed at a preset ratio. That is, the seventh image can display a region with features of different images (such as the first image, the second image, or the third image). In this way, the user can view the features of different images in one image, so that the user experience is improved.

Figure 13:
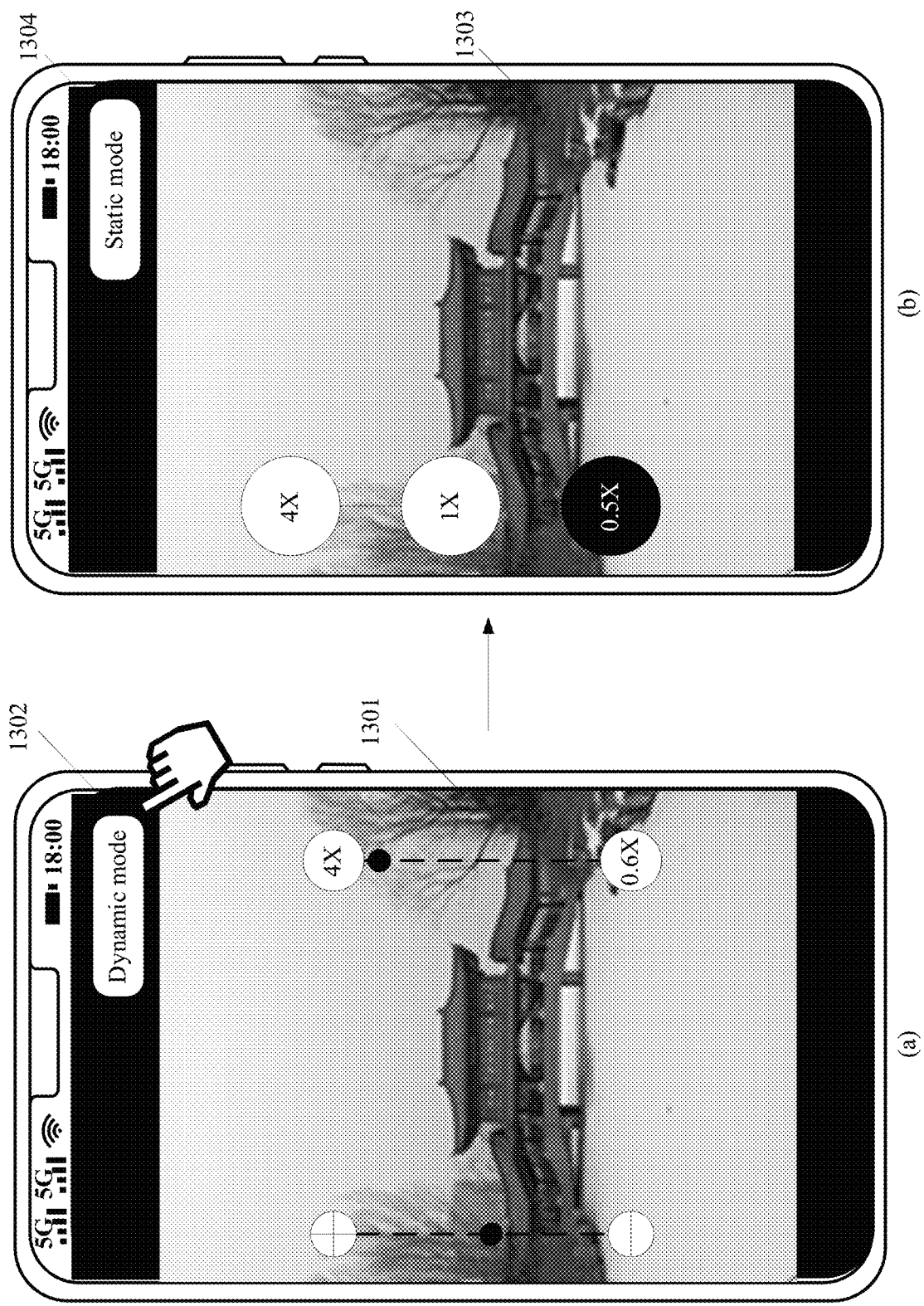
FIG. 13 is a schematic diagram of an example of another image display interface according to an embodiment of this application.

In some embodiments, the electronic device can switch a display mode of the seventh image. In a possible design, when an interface displayed by the electronic device is the first interface, that is, the electronic device plays a dynamic screen in which the seventh image is centered on the third region image and is automatically zoomed, the first interface further includes a manual playback button, where the manual playback button is configured to trigger the electronic device to display a second interface. The electronic device can receive an operation performed on the manual playback button, and switch the displayed interface from the first interface to the second interface. For example, as shown in (a) in FIG. 13, the dynamic image interface 1301 displayed by the electronic device can include a manual playback button 1302. For example, the manual playback button 1302 can be "Dynamic mode". The interface displayed by the electronic device can be switched from the dynamic image interface 1301 to the static image interface 1303 shown in (b) in FIG. 13 in response to an operation performed on the manual playback button 1302 by the user.

In another possible design, when the interface displayed by the electronic device is the second interface, the second interface can further include an automatic playback button, where the automatic playback button is configured to trigger the electronic device to display a first interface. For example, as shown in (b) in FIG. 13, the static image interface 1303 includes an automatic playback button 1304. For example, the automatic playback button 1304 may be "Static mode". The electronic device can receive an operation performed on the automatic playback button, and switch the displayed interface from the second interface to the first interface.

It may be understood that after receiving the operation performed by the user, the electronic device can switch a display mode of the seventh image. In this way, the user can flexibly select a mode for displaying the seventh image, so that the user experience is improved.

It should be noted that, there are many types of images stored in the electronic device. The electronic device can display common types of images in a common display manner. For example, the electronic device can display the telephoto image, the main image, or the like on a screen. The electronic device can also display the seventh image in a preset mode.

In some embodiments, to facilitate the electronic device to determine a display mode of the image, when saving the seventh image, the electronic device can add a first identifier to image information of the seventh image, where the first identifier is used for instructing the electronic device to display the seventh image in the preset mode. The electronic device can determine, according to the image information of the image in response to the second operation, whether to display the image in the preset mode. For example, after receiving the second operation performed by the user, the electronic device can detect whether the image information of the image includes the first identifier. If the image information includes the first identifier, the electronic device can display the image in the preset mode. If the image information does not include the first identifier, the electronic device can display the image in a common display manner.

It may be understood that the electronic device adds the first identifier to the seventh image, so that the electronic device can display the seventh image in the preset mode. In this way, the interest of viewing an image by the user is increased, and the user experience is improved.

It should be noted that, after the electronic device captures the seventh image, the electronic device can share the seventh image with other electronic devices. Other electronic devices can display the seventh image in different display manners according to whether the electronic device has the capability to identify the first identifier.

In some embodiments, the electronic device (for example, the first device) that receives the seventh image can display the seventh image in the preset mode, and the first device has the capability to identify the first identifier. Specifically, the electronic device can share the seventh image with the first device. After receiving the seventh image, the first device can detect and identify the first identifier of the seventh image. Then, the first device can display the seventh image in the preset mode. For example, the first device can display the seventh image in the dynamic mode in response to the second operation.

In some other embodiments, the electronic device (for example, a second device) that receives the seventh image can display the seventh image in the common display manner, and the second device does not have the capability to identify the first identifier. Specifically, the electronic device can share the seventh image with the second device. After receiving the seventh image, the second device cannot identify the first identifier of the seventh image. Then, the second device can display the seventh image in the common display manner. For example, the second device can display the seventh image on a screen of the second device in response to the second operation.

It should be noted that, if other electronic devices do not have the capability to identify the first identifier, the electronic device cannot display the seventh image that is automatically zoomed, and consequently, the user experience is affected.

In some other embodiments, to enable the electronic device that cannot identify the first identifier to view the seventh image that is automatically zoomed, the electronic device can convert a file format of the seventh image. Specifically, when an interface displayed by the electronic device is the first interface, that is, the electronic device plays a dynamic screen in which the seventh image is centered on the third region image and is automatically zoomed, the first interface may further include a format conversion button, where the format conversion button is configured to trigger the electronic device to convert a file format of the seventh image. The electronic device can receive a third operation performed on the format conversion button to generate a first file. The third operation is used for triggering the electronic device to convert a file format of the seventh image, and the first file is a file in which the seventh image is centered on the third region image and is automatically zoomed. For example, the electronic device can generate a video file, or the electronic device can generate a dynamic image file. Then, the electronic device can share the first file with other electronic devices. For example, when the first file is a graphics interchange format (Graphics Interchange Format, GIF) image, the electronic device can share the GIF image with other electronic devices.

It should be noted that, an automatic zoom speed of the seventh image in the first file and the maximum ratio at which the seventh image can be zoomed in can be set by using the first speed option and the first ratio option. This is not limited in this embodiment of this application.

It may be understood that the first file can automatically zoom the seventh image in any electronic device. In this way, after receiving the first file, other electronic devices can display the automatically zoomed seventh image, so that the user experience is improved.

The solutions provided in the embodiments of this application are mainly described above from a perspective of an electronic device. It may be understood that to implement the foregoing functions, the electronic device includes corresponding hardware structures and/or software modules for performing the functions. A person skilled in the art should be easily aware that in combination with an image fusion method of examples described in the embodiments disclosed in this application, this application can be implemented by hardware or a combination of hardware and computer software. Whether a function is performed by hardware or electronic device software driving hardware depends on particular applications and design constraints of the technical solutions. A person skilled in the art may use different methods to implement the described functions for each particular application, but it should not be considered that the implementation goes beyond the scope of this application.

In the embodiments of this application, function module division or functional unit division may be performed on the image fusion apparatus based on the foregoing method example, for example, each function module or functional unit may be divided corresponding to each function, or two or more functions may be integrated into one processing module. The integrated module may be implemented in a form of hardware, or may be implemented in a form of a software function module or functional unit. The module or unit division in the embodiments of this application is an example and is merely logical function division, and may be other division during actual implementation.

Other embodiments of this application provide an electronic device (such as the mobile phone 200 shown in FIG. 2A). The electronic device may include a memory and one or more processors. The memory is coupled to the processor. The electronic device may further include a camera. Alternatively, the electronic device may be connected to an external camera. The memory is configured to store computer program code, and the computer program code includes computer instructions. When the processor executes the computer instructions, the electronic device can execute various functions or steps executed by the mobile phone in the foregoing method embodiments. For a structure of the electronic device, reference may be made to a structure of the mobile phone 200 shown in FIG. 2A.

Figure 14:
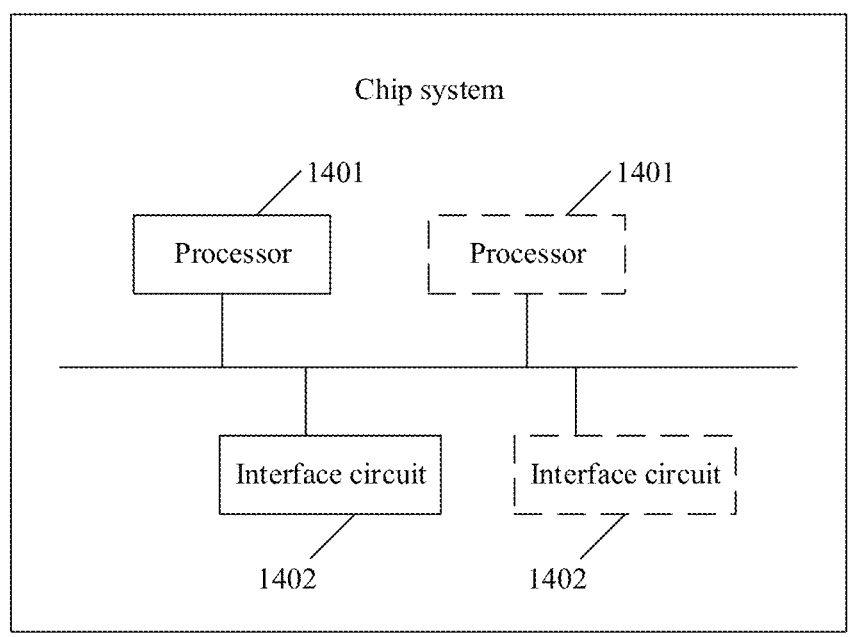
FIG. 14 is a schematic diagram of structural composition of a chip system according to an embodiment of this application.

This embodiment of this application further provides a chip system. As shown in FIG. 14, the chip system includes at least one processor 1401 and at least one interface circuit 1402. The processor 1401 and the interface circuit 1402 can be connected to each other by using a line. For example, the interface circuit 1402 can be configured to receive signals from other apparatuses (such as a memory of the electronic device). In another example, the interface circuit 1402 can be configured to send signals to other apparatuses (for example, the processor 1401). For example, the interface circuit 1402 can read instructions stored in the memory and send the instructions to the processor 1401. When the instructions are executed by the processor 1401, the electronic device (the mobile phone 200 shown in FIG. 2A) can be made to perform the steps in the foregoing embodiments. Certainly, the chip system may further include other discrete devices, which are not specifically limited in the embodiments of this application.

The embodiments of this application further provide a computer-readable storage medium, where the computer-readable storage medium includes computer instructions. The computer instructions, when run on the electronic device (the mobile phone 200 shown in FIG. 2A), cause the electronic device to implement the functions or steps implemented by the mobile phone in the foregoing method embodiments.

This embodiment of this application further provides a computer program product, when run on a computer, causing the computer to implement the functions or steps implemented by the mobile phone in the foregoing method embodiments.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM (read only memory, ROM), a RAM (random access memory, RAM), a magnetic disk, or an optical disc.

The foregoing contents are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image fusion method, applicable to an electronic device, wherein the electronic device comprises a first camera, a second camera, and a third camera, a field of view of the first camera is greater than a field of view of the second camera, and a field of view of the third camera is greater than the field of view of the first camera, the method comprising:

detecting, by the electronic device, a first operation;
 capturing, by the electronic device, a first image through the first camera, a second image through the second camera, and a third image through the third camera in response to the first operation, wherein a viewfinder coverage in which the first camera captures the first image is a first viewfinder coverage, a viewfinder coverage in which the second camera captures the second image is a second viewfinder coverage, a viewfinder coverage in which the third camera captures the third image is a third viewfinder coverage, the third viewfinder coverage is greater than the first viewfinder coverage, and the first viewfinder coverage is greater than the second viewfinder coverage;
 processing, by the electronic device, the first image to obtain a fourth image, wherein the fourth image comprises a first region image, a resolution of the first region image in the fourth image is the same as a resolution of the second image, a viewfinder coverage of the first region image relative to the first camera is a fourth viewfinder coverage, the first viewfinder coverage comprises the fourth viewfinder coverage, and the fourth viewfinder coverage coincides with the second viewfinder coverage;
 performing, by the electronic device, image fusion on the second image and the fourth image to obtain a fifth image;
 processing, by the electronic device, the third image to obtain a sixth image, wherein the sixth image comprises a second region image, a resolution of the second region image in the sixth image is the same as a resolution of the fifth image, a viewfinder coverage of the second region image relative to the third camera is a fifth viewfinder coverage, the third viewfinder coverage comprises the fifth viewfinder coverage, and the fifth viewfinder coverage coincides with the first viewfinder coverage; and
 performing, by the electronic device, image fusion on the fifth image and the sixth image to obtain a seventh image;

receiving, by the electronic device, a second operation, wherein the second operation is used for triggering the electronic device to display the seventh image; and displaying, by the electronic device, a second interface in response to the second operation, wherein the second interface comprises the seventh image and a preset ratio option, and the preset ratio option is configured to set a zoom ratio of the seventh image; and receiving, by the electronic device, a zoom ratio set by a user in the preset ratio option, and displaying the seventh image according to the zoom ratio set by the user.

2. The method according to claim 1, wherein the processing, by the electronic device, the first image to obtain a fourth image comprises:

performing, by the electronic device, super-resolution reconstruction on the first image to obtain the fourth image.

3. The method according to claim 1, wherein the processing, by the electronic device, the third image to obtain a sixth image comprises:

performing, by the electronic device, super-resolution reconstruction on the third image to obtain the sixth image.

4. The method according to claim 1, wherein the second interface further comprises an automatic playback button, and the automatic playback button is configured to trigger the electronic device to display a first interface, wherein the first interface is configured to play a dynamic screen in which the seventh image is centered on a third region image and is automatically zoomed, wherein the seventh image comprises the third region image, a viewfinder coverage of the third region image relative to the third camera is a sixth viewfinder coverage, the third viewfinder coverage comprises the sixth viewfinder coverage, and the sixth viewfinder coverage coincides with the second viewfinder coverage.

5. The method according to claim 1, wherein the first camera is a main camera, the second camera is a telephoto camera, and the third camera is a wide-angle camera.

6. An image fusion method, applicable to an electronic device, wherein the electronic device comprises a first camera, a second camera, a third camera, and a fourth camera, a field of view of the first camera is greater than a field of view of the second camera, a field of view of the third camera is greater than the field of view of the first camera, and a field of view of the fourth camera is the same as the field of view of the first camera, the method comprising:

detecting, by the electronic device, a first operation;

capturing, by the electronic device, a first image through the first camera, a second image through the second camera, a third image through the third camera, and an eighth image through the fourth camera in response to the first operation, wherein a viewfinder coverage in which the first camera captures the first image is a first viewfinder coverage, a viewfinder coverage in which the second camera captures the second image is a second viewfinder coverage, a viewfinder coverage in which the third camera captures the third image is a third viewfinder coverage, the third viewfinder coverage is greater than the first viewfinder coverage, the first viewfinder coverage is greater than the second viewfinder coverage, and a viewfinder coverage in which the fourth camera captures the eighth image is the same as the first viewfinder coverage;

performing, by the electronic device, image fusion on the first image and the eighth image to obtain a ninth image;

processing, by the electronic device, the ninth image to obtain a fourth image, wherein the fourth image comprises a first region image, a resolution of the first region image in the fourth image is the same as a resolution of the second image, a viewfinder coverage of the first region image relative to the first camera is a fourth viewfinder coverage, the first viewfinder coverage comprises the fourth viewfinder coverage, and the fourth viewfinder coverage coincides with the second viewfinder coverage;

performing, by the electronic device, image fusion on the second image and the fourth image to obtain a fifth image;

processing, by the electronic device, the third image to obtain a sixth image, wherein the sixth image comprises a second region image, a resolution of the second region image in the sixth image is the same as a resolution of the fifth image, a viewfinder coverage of the second region image relative to the third camera is a fifth viewfinder coverage, the third viewfinder coverage comprises the fifth viewfinder coverage, and the fifth viewfinder coverage coincides with the first viewfinder coverage; and performing, by the electronic device, image fusion on the fifth image and the sixth image to obtain a seventh image.

7. The method according to claim 6, wherein the processing, by the electronic device, the ninth image to obtain a fourth image comprises:

performing, by the electronic device, super-resolution reconstruction on the ninth image to obtain the fourth image.

8. The method according to claim 6, wherein the processing, by the electronic device, the third image to obtain a sixth image comprises:

performing, by the electronic device, super-resolution reconstruction on the third image to obtain the sixth image.

9. The method according to claim 6, wherein after the performing, by the electronic device, image fusion on the fifth image and the sixth image to obtain a seventh image, the method further comprises:

receiving, by the electronic device, a second operation, wherein the second operation is used for triggering the electronic device to display the seventh image; and displaying, by the electronic device, a first interface in response to the second operation, wherein the first interface is configured to play a dynamic screen in which the seventh image is centered on a third region image and is automatically zoomed, wherein the seventh image comprises the third region image, a viewfinder coverage of the third region image relative to the third camera is a sixth viewfinder coverage, the third viewfinder coverage comprises the sixth viewfinder coverage, and the sixth viewfinder coverage coincides with the second viewfinder coverage.

10. The method according to claim 9, wherein the first interface further comprises a first speed option and a first ratio option, wherein the first speed option is configured to adjust a playback speed of the dynamic screen, and the first ratio option is configured to adjust a maximum zoom ratio of the seventh image in the first interface; and the method further comprising:
adjusting, by the electronic device, the playback speed of the dynamic screen in response to an adjustment operation performed by a user on the first speed option; and
adjusting, by the electronic device, the maximum zoom ratio of the seventh image in response to an adjustment operation performed by the user on the first ratio option.

11. The method according to claim 9, wherein the first interface further comprises a manual playback button, wherein the manual playback button is configured to trigger the electronic device to display a second interface, wherein
the second interface comprises the seventh image and a preset ratio option, and the preset ratio option is configured to set a zoom ratio of the seventh image.

12. The method according to claim 6, wherein after the performing, by the electronic device, image fusion on the fifth image and the sixth image to obtain a seventh image, the method further comprises:
receiving, by the electronic device, a second operation, wherein the second operation is used for triggering the electronic device to display the seventh image; and
displaying, by the electronic device, a second interface in response to the second operation, wherein the second interface comprises the seventh image and a preset ratio option, and the preset ratio option is configured to set a zoom ratio of the seventh image; and
the method further comprising:
receiving, by the electronic device, a zoom ratio set by a user in the preset ratio option, and displaying the seventh image according to the zoom ratio set by the user.

13. The method according to claim 12, wherein the second interface further comprises an automatic playback button, and the automatic playback button is configured to trigger the electronic device to display a first interface, wherein
the first interface is configured to play a dynamic screen in which the seventh image is centered on a third region image and is automatically zoomed, wherein the seventh image comprises the third region image, a viewfinder coverage of the third region image relative to the third camera is a sixth viewfinder coverage, the third viewfinder coverage comprises the sixth viewfinder coverage, and the sixth viewfinder coverage coincides with the second viewfinder coverage.

14. The method according to claim 6, wherein the electronic device comprises a processor configured to perform the method.

15. The method according to claim 6, wherein the electronic device comprises a processor configured to:
perform the super-resolution reconstruction on the ninth image to obtain the fourth image.

16. The method according to claim 6 wherein the electronic device comprises a processor configured to:
perform the super-resolution reconstruction on the third image to obtain the sixth image.

17. An electronic device, comprising:
a processor configured to:
detect a first operation;
capture a first image through a first camera, a second image through a second camera, and a third image through a third camera in response to the first operation, wherein a viewfinder coverage in which the first camera captures the first image is a first viewfinder coverage, a viewfinder coverage in which the second camera captures the second image is a second viewfinder coverage, a viewfinder coverage in which the third camera captures the third image is a third viewfinder coverage, the third viewfinder coverage is greater than the first viewfinder coverage, and the first viewfinder coverage is greater than the second viewfinder coverage;
process the first image to obtain a fourth image, wherein the fourth image comprises a first region image, a resolution of the first region image in the fourth image is the same as a resolution of the second image, a viewfinder coverage of the first region image relative to the first camera is a fourth viewfinder coverage, the first viewfinder coverage comprises the fourth viewfinder coverage, and the fourth viewfinder coverage coincides with the second viewfinder coverage;
perform image fusion on the second image and the fourth image to obtain a fifth image;
process the third image to obtain a sixth image, wherein the sixth image comprises a second region image, a resolution of the second region image in the sixth image is the same as a resolution of the fifth image, a viewfinder coverage of the second region image relative to the third camera is a fifth viewfinder coverage, the third viewfinder coverage comprises the fifth viewfinder coverage, and the fifth viewfinder coverage coincides with the first viewfinder coverage; and
perform image fusion on the fifth image and the sixth image to obtain a seventh image
receive a second operation, wherein the second operation is used for triggering the electronic device to display the seventh image; and
display a first interface in response to the second operation, wherein the first interface is configured to play a dynamic screen in which the seventh image is centered on a third region image and is automatically zoomed, wherein the seventh image comprises the third region image, a viewfinder coverage of the third region image relative to the third camera is a sixth viewfinder coverage, the third viewfinder coverage comprises the sixth viewfinder coverage, and the sixth viewfinder coverage coincides with the second viewfinder coverage.

18. The electronic device of claim 17, wherein the fourth image is obtained by performing super-resolution reconstruction on the first image.

19. The electronic device of claim 17, wherein the sixth image is obtained by performing super-resolution reconstruction on the third image.

20. The electronic device of claim 17, wherein the first camera is a main camera, the second camera is a telephoto camera, and the third camera is a wide-angle camera.

* * * * *